United States Patent
Vija et al.

(10) Patent No.: US 8,058,601 B2
(45) Date of Patent: Nov. 15, 2011

(54) DETERMINING A MULTIMODAL PIXON MAP FOR TOMOGRAPHIC-IMAGE RECONSTRUCTION

(75) Inventors: Alexander Hans Vija, Evanston, IL (US); Amos Yahil, Stony Brook, NY (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 519 days.

(21) Appl. No.: 12/369,176

(22) Filed: Feb. 11, 2009

(65) Prior Publication Data
US 2010/0014733 A1    Jan. 21, 2010

Related U.S. Application Data

(60) Provisional application No. 61/081,121, filed on Jul. 16, 2008.

(51) Int. Cl.
*H01L 27/00*    (2006.01)

(52) U.S. Cl. .................. 250/208.1; 250/214 R

(58) Field of Classification Search ........... 250/208.1, 250/214 R, 363.05–363.1, 370.01–370.15; 382/128–131, 228, 275–286, 307; 378/8–15, 378/98.8–98.12
See application file for complete search history.

(56) References Cited

U.S. PATENT DOCUMENTS

| | | | |
|---|---|---|---|
| 5,155,365 A | 10/1992 | Cann et al. | |
| 6,399,951 B1 | 6/2002 | Paulis et al. | |
| 6,956,925 B1 | 10/2005 | Hoffman | |
| 7,863,574 B2 * | 1/2011 | Hahn et al. | 250/363.05 |

OTHER PUBLICATIONS

K.J. Mighell, "Parameter estimation in astronomy with Poisson-distributed data. II. The modified chi-square gamma statistic", 2000, arXiv:astro-ph/0007328.
J. Hadamard, "Sur les problèmes aux dérivées partielles et leur signification physique", Princeton Uni. Bull., 13, 49-52, (1902).
Tsui, B.M.W., et al., "Quantitative cardiac SPECT reconstruction with reduced image degradation due to patient anatomy", IEEE Trans. Nuc. Sci., 41, 2838-44, 1994.
Gorman, J.D. and Hero, A.O., "Lower bounds for parametric estimation with constraints", IEEE Trans. Information Theory, vol. 36, No. 6, pp. 1285-1301, 1990.
Siemens Medical, "Symbia SPECT Working for You", Product Information, 2007.
Haacke, et al., "Constrained reconstruction: A super-resolution, optimal signal-to-noise alternative to the Fourier transform in magnetic resonance imaging", Medical Physics, vol. 16, No. 3, pp. 388-397, 1989.
Halder, et al., "Anatomically constrained reconstruction from noisy data", Magn. Reson. Med., vol. 59, No. 4, pp. 810-818, Apr. 2008.
Rangarajan, et al., "A model-based approach for filtering and edge detection in noisy images", IEEE Trans. Circuits and Systems, vol. 37, No. 1, pp. 140-144, 1990.

(Continued)

*Primary Examiner* — Que T Le
(74) *Attorney, Agent, or Firm* — Peter Kendall

(57) ABSTRACT

A computer-implemented method includes causing a computer system to execute instructions for providing a first data set and a second data set, each derived from a common object, providing a first tomographic image object associated with the first data set providing a second tomographic image object associated with the second data set, generating a multimodal pixon map for pixon smoothing on the basis of the first data set, the first tomographic image object, the second data set, and the second tomographic image object, and outputting the multimodal pixon map.

21 Claims, 12 Drawing Sheets

OTHER PUBLICATIONS

Roggemann, et al., "Model-based image reconstruction by means of a constrained least-squares solution", Appl Opt, vol. 36, No. 11, pp. 2360-2369, Apr. 10, 1997.

Roy, et al., "Three-dimensional unconstrained and constrained image-reconstruction techniques applied to fluorescence, frequency-domain photon migration", Appl. Opt., vol. 40, No. 13, pp. 2206-15, May 1, 2001.

Tapiovaara, M.J. and Wagner, R.F., "SNR and noise measurements medical imaging: I. A practical approach based on statistical decision theory", Phys. Med. Biol., vol. 38, pp. 71-92, 1993.

Hadamard, J.,"Lectures on Cauchy's Problem in Linear Partial Differential Equations", New Haven: Yale Press. Reprinted 1952. New York: Dover Publications. (Webpage print out of coverpage, synopsis and table of contents from www.bn.com).

Green, P.J. and Silverman, B.W., "Generalized Linear Models: A Roughness Penalty Approach", Chapman & Hall/ CRC, 1994 (Webpage print out of coverpage, synopsis and table of contents from www.bn.com).

Shieh, et al., "Iterative image reconstruction using prior knowledge," J Opt Soc Am A Opt Image Sci Vis, vol. 23, No. 6, pp. 1292-1300, Jun. 2006.

Adluru, et al., "Temporally constrained reconstruction of dynamic cardiac perfusion MRI", Magn. Reson. Med., vol. 57, No. 6, pp. 1027-1036, (Jun. 2007).

Hudson, et al., "Accelerated image reconstruction using ordered subsets of projection data", IEEE Trans. Med. Imaging, vol. 13, No. 4, pp. 601-609 (1994).

Turkheimer, et al., "PET image denoising using a synergistic multi-resolution analysis of structural (MRI/CT) and functional datasets", J. Nucl. Med., 49:657-66.

Somayajula, et al. "PET image reconstruction using anatomical information through mutual information based priors." pp. 2722-2726.

Sureau, et al. "Impact of Image-Space Resolution Modeling for Studies with the High-Resolution Research Tomograph," J Nucl Med, vol. 49, No. 6, pp. 1000-1008, Jun. 1, 2008.

Alenius, et al.., "Generalization of median root prior reconstruction," IEEE Trans. Med. Imaging, vol. 21, No. 11, pp. 1413-1420, Nov. 2002.

Hsu, C.., "A prior image model with mixed continuity constraints for Bayesian PET image reconstruction," Nuclear Science Symposium, 1999, Conference Record, 1999 IEEE, vol. 3, pp. 1428-1432, Seattle, Washington, Oct. 1999.

Gindi, G., et al., "Bayesian reconstruction of functional images using anatomical information as priors", IEEE Trans. Med. Imaging, vol. 12, No. 4, pp. 670-680, 1993.

Zhenyu, et al., "Approximate maximum likelihood hyper-parameter estimation for Gibbs priors." Image Processing, IEEE Transactions on, vol. 6, No. 6, pp. 844-861, 1997.

Reutter, et al., "Direct least-squares estimation of spatiotemporal distributions from dynamic SPECT projections using a spatial segmentation and temporal B-splines," Medical Imaging, IEEE Transactions on, vol. 19, No. 5, pp. 434-450, 2000.

Parra, et al., "List-mode likelihood: EM algorithm and image quality estimation demonstrated on 2-D PET," Medical Imaging, IEEE Transactions on, vol. 17, No. 2, pp. 228-235, 1998.

Nuyts, et al. "Simultaneous maximum a posteriori reconstruction of attenuation and activity distributions from emission sinograms," Medical Imaging, IEEE Transactions on 5 vol. 18, No. 5. pp. 393-403, 1999.

Hero, et al., "Information analysis of single photon emission computed tomography with count losses", Medical Imaging 9, IEEE Transactions, pp. 117-127 (1990).

Kadrmas, et al., "Maximum a posteriori algorithm for the reconstruction of dynamic SPECT data", IEEE Nuclear Science Symposium and Medical Imaging Conference, vol. 3, pp. 2086-2089, Nov. 8-14, 1998.

Kawata, et al., "Constrained Iterative Reconstruction by the Conjugate Gradient Method" IEEE Trans. Med. Imaging, vol. 4, No. 2, pp. 65-71, 1985.

LaRiviere, et al., "Nonparametric regression sonogram smoothing using a roughness-penalized Poisson likelihood objective function", IEEE Trans. Med. Imaging, vol. 19, No. 8, pp. 773-786, 2000.

Chiao, et al., "Model-based estimation for dynamic cardiac studies using ECT", IEEE Trans. Med. Imaging, vol. 13, No. 2, pp. 217-226, 1994.

Nichols, et al, "Spatiotemporal reconstruction of list-mode PET data," Medical Imaging, IEEE Transactions on, vol. 21, No. 4, pp. 396-404, 2002.

Kadrmas, et al., "4D maximum a posteriori reconstruction in dynamic SPECT using a compartmental model-based prior," Physics in Medicine and Biology, vol. 46, No. 5, pp. 1553-1574, 2001.

D. J. Kadrmas, "Statistically regulated and adaptive EM reconstruction for emission computed tomography," Nuclear Science, IEEE Transactions on, vol. 48, No. 3, pp. 790-798, 2001.

Shao, L., et al., "Information gain from count correction in Spect image reconstruction and classification", IEEE Trans. Nucl. Science, vol. 37, No. 2, pp. 652-657, 1990.

Shieh, et al., "Image reconstruction: a unifying model for resolution enhancement and data extrapolation. Tutorial," J Opt Soc Am A Opt Image Sci Vis, vol. 23, No. 2, pp. 258-266, Feb, 2006.

Mighell, K.J., "Parameter estimation in astronomy with poisson-distributed data I. The statistic", Astrophys. J. 518, 380-393.

Wesolowski, C.A., et al., "Improved lesion detection from spatially adaptive, minimally complex Pixon® reconstruction of planar scintigraphic images", Comput. Med. Imaging Graph., 65-81.

Wernick, et al., "Emission tomography: the fundamentals of PET and SPECT", Chapters 7,11 and 21, Elsevier, Academic Press, 2004.

Galatsanos, et al., "Methods for Choosing the Regularization Parameter and Estimating the Noise Variance in Image Restoration and Their Relation", IEEE Transactions on Image Processing, vol. 1, No. 3, pp. 322-336 (Jul. 1992).

Fessler, et al., "Space-alternating generalized expectation-maximization algorithm", Signal Processing, IEEE T-SP 42 (10): 2664-77, (Oct. 1994).

Puetter, et al., "Digital Image reconstruction: deblurring and denoising", Annu. Rev. Astro. Astrophys., 2005, 43:139-194.

Puetter, et al., "The pixon method of image reconstruction", Astronomical Data Analysis Software and Systems VIII, Astronomical Society of the Pacific, Conference Series 1999, 172, 307-316.

Lehovich, et al., "Human observer LROC study of lesion detection in Ga-67 SPECT images reconstructed using MAP with anatomical priors", 2006 IEEE nucl., Sci. Symp. Conf. Rec., 1699-702.

Lehovich, et al., "Choosing anatomical-prior strength for MAP SPECT reconstruction to maximize lesion detectability", 2007 IEEE Nucl. Sci. Syrnp. Conf. Rec., 4222-5.

\* cited by examiner

DETERMINING A MULTIMODAL PIXON MAP FOR TOMOGRAPHIC-IMAGE RECONSTRUCTION

CROSS-REFERENCE TO RELATED APPLICATION

This application claims the benefit of priority under 35 U.S.C. §119(e) of U.S. Provisional Patent Application Ser. No. 61/081,121, filed on Jul. 16, 2008.

TECHNICAL FIELD

This invention relates to three-dimensional image reconstruction, and in particular, to image reconstruction using a pixon method.

BACKGROUND

Tomographic-image reconstruction is the reconstruction of three or more dimensional images (herein also referred to as image objects) in various medical imaging fields, including computer tomography (CT), Single Photon Computed Tomography (SPECT), Positron Emission Tomography (PET), and Magnetic Resonance (MR) Tomography. An overview of SPECT systems, PET systems, and their combination with CT systems as well as iterative image reconstruction for emission tomography is given in chapter 7, chapter 11, and chapter 21 of M. Wernick and J. Aarsvold, "Emission tomography: the fundamentals of PET and SPECT," Elsevier Academic Press, 2004, the contents of which are herein incorporated by reference.

An overview of different reconstruction methods including a pixon method is given in R. C. Puetter et al., "Digital Image Reconstruction: Deblurring and Denoising," Annu. Rev. Astro. Astrophys., 2005, 43: 139-194; the pixon method is described in R. C. Puetter et al., "The pixon method of image reconstruction," Astronomical Data Analysis Sottware and Systems VIII., edited by D. M. Mehringer, R. L,. Plante D. A. Roberts, Astronomical Society of the Pacific, San Francisco, ASP Conference Series 1999, 172, 307-316, the contents of which are herein incorporated by reference. An application of the pixon method to medical planar imaging is discussed in C. A. Wesolowski et al., "Improved lesion detection from spatially adaptive, minimally complex, pixon® reconstruction of planar scintigraphic images", Comput. Med. Imaging Graph., 2005, 29, 65-81, the contents of which are herein incorporated by reference.

SUMMARY

The invention is based in part on the recognition that one can base pixon smoothing of a tomographic image object on a multimodal pixon map that is derived from image data whereby the image data is not restricted to the image data used for reconstructing the tomographic image object. Thus, a multimodal pixon map can be derived from image data of one or more modalities, without having to include, as one of those modalities, the particular modality that provided the image data being used to reconstruct the tomographic image object. The tomographic image object can originate from a tomographic reconstruction in three dimensions, e.g., the three spatial coordinates X, Y, and Z. The tomographic reconstruction can also include one or more additional dimensions, e.g., a reconstruction in 4D or more dimensions that include three spatial coordinates and one or more additional coordinates representing, e.g., time information, energy information, frequency information.

In one aspect, the invention features computer-implemented methods that cause a computer system to execute instructions for providing a first data set and a second data set, each derived from a common object, providing a first tomographic image object associated with the first data set, providing a second tomographic image object associated with the second data set, generating a multimodal pixon map for pixon smoothing on the basis of the first data set, the first tomographic image object, the second data set, and the second tomographic image object, and outputting the multimodal pixon map.

In another aspect, the invention features computer-implemented methods that cause a computer system to execute instructions for providing a first data set and a second data set, each derived from a common object, providing a first tomographic image object associated with the first data set, providing a second tomographic image object associated with the second data set, generating a multimodal pixon map at least partly on the basis of the second data set and the second tomographic image object, on the basis of the multimodal pixon map, performing pixon smoothing of the first tomographic image object, thereby generating a pixon smoothed tomographic image object, and outputting the pixon smoothed image object.

In another aspect, the invention features medical imaging systems that include a data acquisition system configured to provide at least a first data set and a second data set derived from a patient, a multimodal pixon map construction unit configured to construct a multimodal pixon map based on at least partly the second data set, and a set of pixon kernel functions, and a pixon reconstruction unit configured to reconstruct a tomographic image object using a pixon smoothing operation based on the multimodal pixon map and the first data set.

Implementations may include one or more of the following features.

In some embodiments, generating the multimodal pixon map can include evaluating a smoothing effect of a pixon kernel function on the first tomographic image object and the second tomographic image object and determining a contribution of the pixon kernel function to the multimodal pixon map based on the evaluation. Evaluating the smoothing effect on the first tomographic image object can be determined with a lower resolution in object space than the smoothing effect on the second tomographic image object.

The second data set can characterize the object with a higher signal-to-noise ratio than the first data set.

In some embodiments, generating the multimodal pixon map can include co-registering an object space associated with the first tomographic image object and an object space associated with the second tomographic image object.

In some embodiments, providing a first data set can include receiving the first data set from a nuclear imaging system.

In some embodiments, providing a second data set can include receiving the second data set from one of a nuclear imaging system, a computed tomography imaging system, and a nuclear magnetic resonance imaging system.

In some embodiments, generating the multimodal pixon map can include for each of the first tomographic image object and second tomographic image object the features of selecting a pixon kernel function from the set of pixon kernel functions, smoothing the first tomographic image object and the second tomographic image object on the basis of the selected pixon kernel function, thereby creating a first smoothed object and a second smoothed object, determining a first statistical object for the selected pixon kernel function on the basis of the first smoothed object, the first data set, and a first statistical weight, determining a second statistical object for the selected pixon kernel function on the basis of the second smoothed object, the second data set, and a second statistical weight, determining a contribution of the pixon kernel function to a multimodal pixon map based on the first statistical object and the second statistical object, and assigning a value to the multimodal pixon map corresponding to the contributions of the pixon kernel functions.

The first statistical object and the second statistical object can be determined on the basis of the first tomographic image object and the second tomographic image object, respectively. Determining at least one of the first statistical object and the second statistical object can include determining a delta object by subtracting the respective object from the smoothed object, determining a delta data model by projecting the delta object from object space into data space, determining statistical data factors by evaluating the delta data model using the data set and a statistical weight, determining statistical object factors by back-projecting the statistical data factors from data space into object space, and determining the statistical object by multiplying the entries of the delta object by the corresponding statistical object factors.

In some embodiments, generating the multimodal pixon map can include providing pixon kernel functions from the group consisting of symmetrical pixon kernel functions, spherical pixon kernel functions, elliptical pixon kernel functions, pixon kernel functions based on a delta-function, pixon kernel functions based on a Gaussian function, pixon kernel functions based on an inverted paraboloid, and pixon kernel functions based on the function $f(x; \beta)=(1+\beta x^2)^{-1/\beta^2}$.

In some embodiments, generating the multimodal pixon map can include determining, in a series of iterations, statistical objects for a set of pixon kernel functions, wherein each iteration includes selecting a pixon kernel function from the set of pixon kernel functions, smoothing the second tomographic image object on the basis of the selected pixon kernel function, thereby creating a second smoothed object, respectively, determining a second statistical object for the selected pixon kernel function on the basis of the second smoothed object, the second data set, and a second statistical weight, and determining contributions of the pixon kernel functions to a multimodal pixon map based on the second statistical object.

In some embodiments, pixon smoothing can be performed within a reconstruction algorithm selected from the group consisting of algorithms based on maximum likelihood, algorithms based on an ordered subset expectation maximization, algorithms based on a non-negative least square fit, algorithms based on an ordered subset non-negative least square fit, and algorithms based on a pixon method, and the reconstruction algorithm is configured to derive a reconstructed image object from the first data set.

In some embodiments, the data acquisition system of the medical imaging system can include a first detector unit for detecting radiation emitted from within the patient and providing data indicative of the detected radiation. The data acquisition system can in addition or alternatively include a second detector unit for detecting radiation transmitted through the patient and providing data indicative of the transmitted radiation. The data acquisition system can further in addition or alternatively include a nuclear magnetic resonance coil system for detecting nuclear magnetic resonance signals emitted from the patient and providing data indicative of the source density of nuclear magnetic resonance signal.

In some embodiments, the multimodal pixon map construction unit can be configured to generate a first smoothed object by pixon smoothing with a single pixon kernel function a first tomographic object derived from the first data set, and to statistically evaluate the goodness-of-fit of the first smoothed object.

In some embodiments, the multimodal pixon map construction unit can be configured to generate a second smoothed object by pixon smoothing with a single pixon kernel function a second tomographic object derived from the second data set, and to statistically evaluate the goodness-of-fit of the second smoothed object.

In some embodiments, the pixon reconstruction unit can be configured to run a reconstruction algorithm selected from the group consisting of algorithms based on maximum likelihood, algorithms based on an ordered subset expectation maximization, algorithms based on a non-negative least square fit, and algorithms based on an ordered subset non-negative least square fit, and wherein the reconstruction algorithm includes at least one pixon smoothing operation based on the multimodal pixon map.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
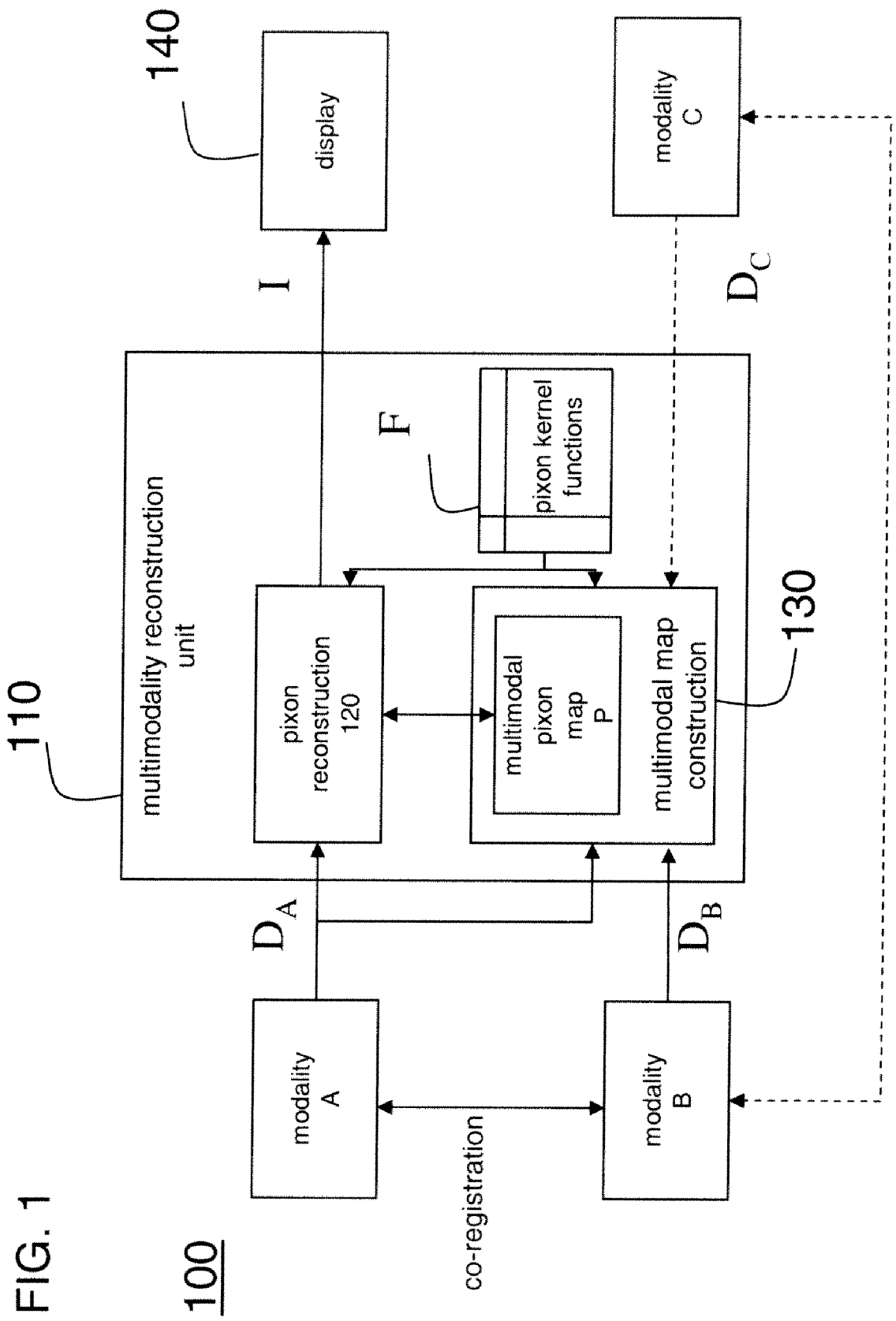
FIG. 1 is an overview of an imaging system with several modalities.

FIG. 1 shows a multimodality imaging system 100 with three medical imaging sub-systems A, B, and C (hereinafter also referred to as modalities), and a multimodality reconstruction (MMR) unit 110. Examples of the modalities A, B, and C include computed tomography (CT) imaging systems, magnetic resonance (MR) imaging systems, nuclear imaging systems (e.g., Positron Emission Tomography (PET) systems and Single Photon Computed Tomography (SPECT) systems). Each of the modalities A, B, and C is configured to measure an image data set $D_A$, $D_B$, or $D_C$ corresponding to anatomical and/or functional features of an examined object, e.g., a body part of person.

The MMR unit 110 executes a pixon reconstruction algorithm 120 to generate a tomographic, e.g. a three or more dimensional image object I from the image data set $D_A$. Such an algorithm 120 is based on a pixon method and executed on a processor of the MMR unit 110. The tomographic image object I is defined in a object space while the image data set $D_A$ is measured in a data space. In general, the pixon method refers to a method that smoothes each point in object space (hereafter an "object point") by assigning a shape or volume to each object point as a basis for the pixon smoothing. The object space is the space in which the result of the image reconstruction is defined and which corresponds to a three or higher dimensional volume (field-of-view or "FOV") that was imaged using one of the modalities A, B, or C.

Multimodal Pixon Map

Before executing the pixon reconstruction algorithm 120, a multimodal pixon map construction algorithm 130 is executed by the MMR unit 10 to determine a multimodal pixon map P on the basis of pixon kernel functions F and at least one of image data sets $D_A$, $D_B$, and $D_C$.

As each of image data sets $D_A$, $D_B$, and $D_C$ in general relates to its own object space, proper co-registration is provided by, for example, known registration techniques that determine the geometrical relation between the object spaces specific of the modalities A, B, and C to register their reconstructed images.

Moreover, one can combine two or more modalities in a single medical imaging system. In one example, a combined SPECT-CT system performs SPECT and CT imaging of an object space that is essentially identical for the combined modalities. In another example, a nuclear imaging system is configured to measure more than one imaging data set each of which is, for example, associated with a radioactive isotope. In the latter example, the two data sets for the two radioactive isotopes can also be represented in a single data set that includes, for example, isotope-resolved entries for the two modalities.

The multimodal pixon map P can be based on more than one of the image data sets $D_A$, $D_B$, and $D_C$. In some cases, the multimodal pixon map P is derived from only one single image data set $D_B$ or $D_C$ from which the tomographic image object I is not reconstructed in the pixon reconstruction unit 120. For example, when reconstructing a nuclear data set one can apply a pixon smoothing operation that is based on a multimodal pixon map derived from a CT data set. Accordingly, the multimodal imaging system 100 enables pixon smoothing based on a multimodal pixon map derived from one or more modalities, without having to include, as one of those modalities, the particular modality that provided the image data set being used to reconstruct the tomographic image object I.

Pixon Reconstruction

Referring again to FIG. 1, the pixon reconstruction algorithm 120 uses a system matrix H to describe the properties of the modality A and to estimate iteratively an improved image object by fitting a data model to the data set $D_A$. The tomographic image object I can then be displayed on a display 140 using well-known volume rendering techniques.

Within this application, "pixon" is used to indicate that a term, method, object etc. refers to the pixon method, i.e., to the use of object point specific shapes (areas or volumes) when smoothing an image object. For example, the assigned shapes are defined by pixon kernel functions F, and the multimodal pixon map P stores the information about which of the pixon kernel functions F is/are assigned to each object point. The pixon kernel function F and the pixon map P can be provided and/or stored, for example, within the multimodal reconstruction unit 110.

In general, pixon reconstruction provides high quality reconstruction of an image object from a measured image data in data space. As a spatially adaptive reconstruction method, the pixon method applies a data-motivated smoothing operation to every object point. The pixon smoothing operation is applied in object space to minimize the effect of noise on the final tomographic image.

Within the multimodality reconstruction unit 110, however, the data motivating the smoothing is not restricted to the image data for which the image object is determined, e.g., in the example of FIG. 1 the image data set $D_A$. Instead, the data motivating the smoothing includes or is based completely on image data $D_B$, and/or $D_C$, . . . acquired with additional modalities B, C, . . . of the multimodality imaging system 100. In doing so, the pixon method uses the principal of minimum complexity for all or the most suited data provided by the multimodality imaging system 100 when assigning to every object point a pixon kernel function.

Thus, in the multimodality reconstruction unit 110, the multimodal pixon map P provides, for every object point, a pixon kernel function that is determined on the basis of a minimum complexity method. Within the pixon reconstruction algorithm 120, the selected pixon kernel functions are then used in a pixon smoothing operation. The pixon method is especially suited for reconstructing a tomographic image object from a measured data set that has a low number of counts and in general an unavoidable noise contribution. Such data sets are often produced by imaging techniques in nuclear medicine, which produce, e.g., tomographic 3D or higher dimensional images of a functional process in a patient's body by using nuclear properties of matter. Examples of such imaging techniques are PET and SPECT. For these types of nuclear imaging, one administers a radioactive substance (with one or more radioactive isotopes) to the patient and detects emitted radiation with a detector system, e.g., with a ring detector for PET or with one or more gamma cameras for SPECT.

A pixon smoothing operation is in general applied to a previously approximated image object. Such an approximated image object can be, for example, the result of an iterative pixon reconstruction algorithm that iteratively fits a data model to a data set according to the rules of the algorithm. Examples of a reconstruction algorithm include algorithms based on maximum likelihood, such as algorithms based on an ordered subset expectation maximization (OSEM), and algorithms based on a non-negative least squares (NNLS) fit, such as conjugate gradient algorithms and algorithms based on an ordered subset non-negative least squares fit. Details of an algorithm based on a non-negative least squares fit are disclosed in the U.S. patent application Ser. No. 11/931,294 filed Oct. 31, 2007 and entitled "NNLS image reconstruction," the contents of which are herein incorporated by reference.

Such an approximated image object can be used as an input object for pixon smoothing (as described in connection with FIG. 7), for pixon reconstruction (as described in connection with FIG. 10), and for multimodal pixon reconstruction (as described in connection with FIG. 12).

In the pixon method, such an approximated image is also used as an input object for the determination of the pixon map as described in connection with FIGS. 2 to 4.

Pixon Map Determination

The pixon method includes a search for the broadest possible pixon kernel functions at each point in object space that together support an adequate fit of an object to the data set D. The information about those broadest possible pixon kernels is stored in the multimodal pixon map P. In particular, the multimodal pixon map P assigns to each object point a specific pixon kernel function. During a pixon smoothing operation, the selected pixon kernel functions are obtained from the values of the multimodal pixon map P. During the determination of the multimodal pixon map P, a statistic appropriate for the data set is used to statistically evaluate the effect of smoothing with a pixon kernel function. For example, when applying the pixon method to data that consists of low numbers of counts and that is assumed to be Poisson distributed, the statistic can be Mighell-like as discussed below and in the above-mentioned U.S. Patent Application "NNLS image reconstruction."

Figure 2:
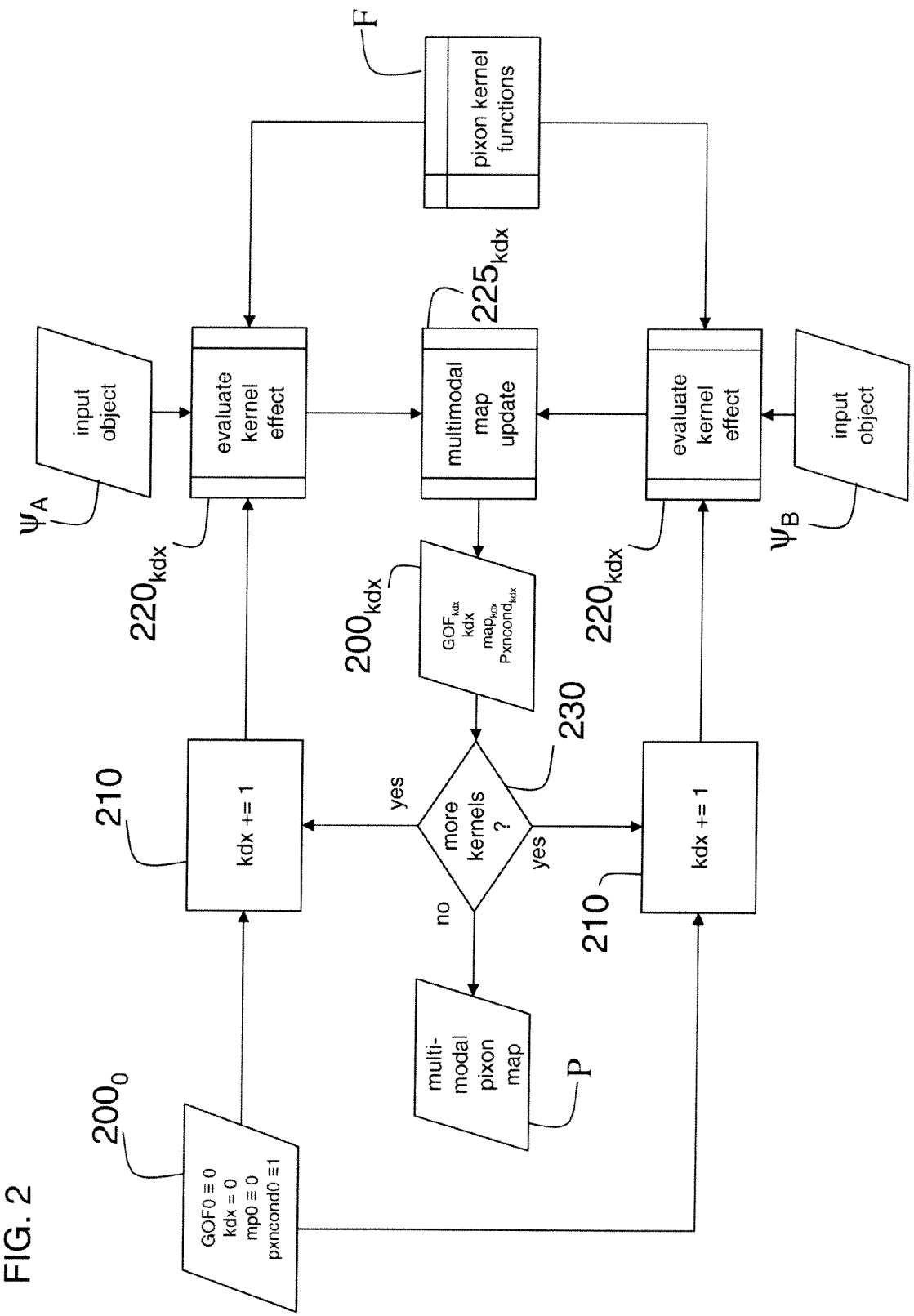
FIG. 2 is a flowchart of an exemplary iterative algorithm for constructing a multimodal pixon map.
Figure 3:
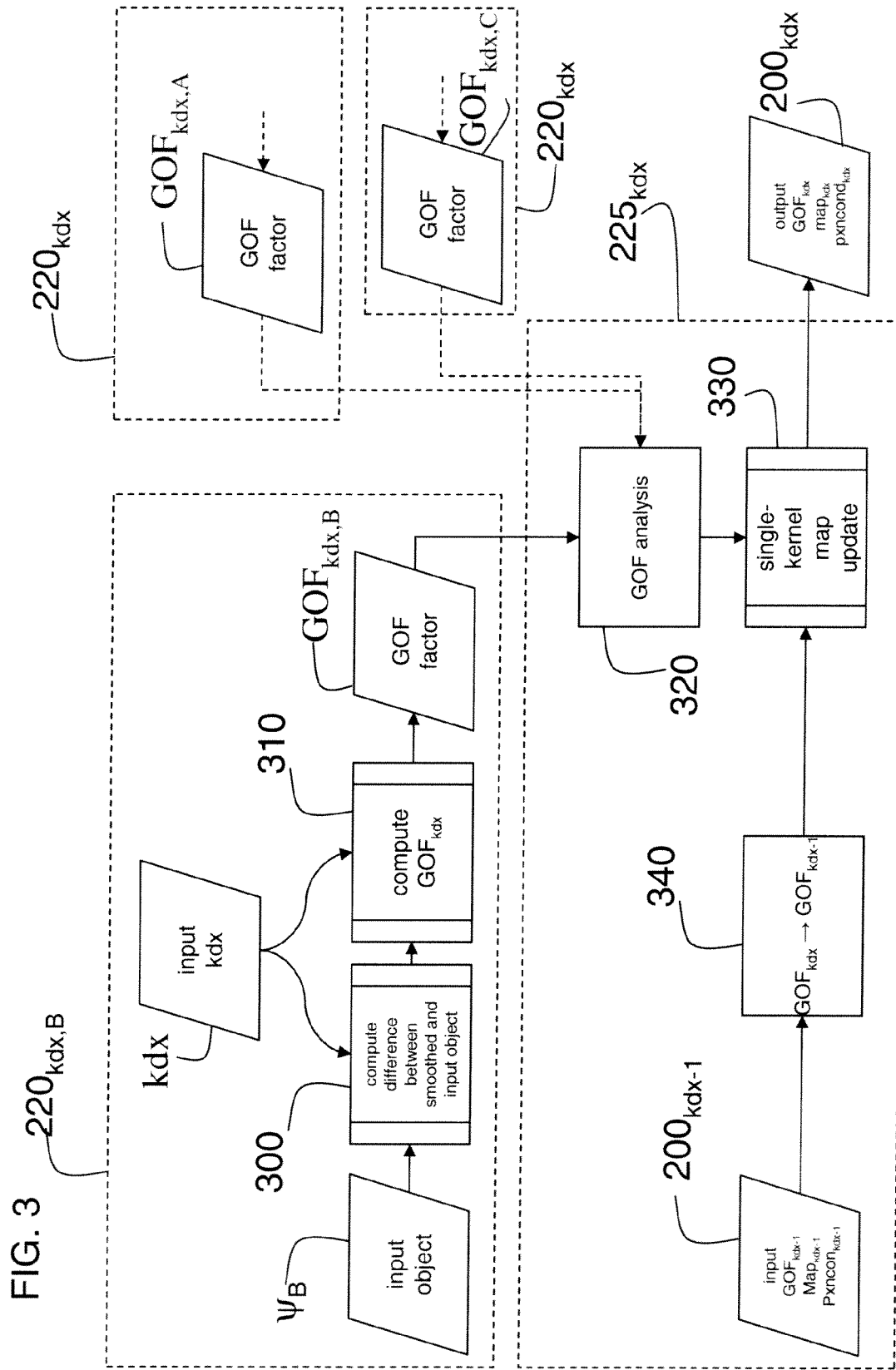
FIG. 3 is a flowchart of an iteration step of the algorithm of FIG. 2.

Referring to FIGS. 2 and 3, when constructing the multimodal pixon map P, one iteratively considers each of the pixon kernel functions individually for one or more of the data sets $D_A$, $D_B$, and $D_C$. First one provides an approximated image, i.e., an input object, for each modality and respective data set. Then, in several iteration steps, one evaluates the extent of smoothing caused by the pixon kernel function of each iteration step. In particular, one calculates, for each modality, a goodness-of-fit for every object point and the pixon kernel function of the iteration step. Employing a statistical evaluation that coincides with a statistic of the specific data set being evaluated increases the accuracy of the multimodal pixon map P. For example, the goodness-of-fit for nuclear image data is based on a statistic that is well suited for low count data. If the calculated goodness-of-fits of an object point fulfills a preset condition, one or more pixon kernel functions are assigned to that object point and the information about the assigned kernel function(s) is stored in the multimodal pixon map P.

FIG. 2 shows a flowchart of an iterative process for constructing the multimodal pixon map P for a multimodality imaging system with two modalities A and B. For each modality, one determines a preliminary reconstructed image object $\psi_A$ and $\psi_B$ as input to each iteration step of the iterative process. For each iteration step of the iterative process, one introduces a broader kernel function.

To start the iterative process, one initializes parameters $200_0$. For example, one sets a goodness-of-fit field (GOF), a kernel pointer (kdx), a pixon map field (map) and a condition field (pxncond) to their respective initial values, e.g., to zero or one. The goodness of fit field (GOF) and the pixon map field (map) record the currently calculated goodness-of-fit values and the assigned pixon kernel functions for each object point, respectively. The condition field (pxncond) indicates for which of the object points an additional broadening of the pixon kernel function might be possible. Thus, as long as a GOF-value for an object point is within a predetermined limit, the value of the condition field (pxncond) corresponding to that object point is set. A set value of the condition field (pxncond) causes the system to test the extent of the smoothing caused by a broader pixon kernel function. A cleared value of the condition field (pxncond) causes the system to bypass this test.

The available pixon kernel functions are maintained in a pixon kernel function table F and are indexed by the kernel pointer kdx, the value of which points to the particular pixon kernel function used in the current iteration. The value of the kernel pointer kdx, which is initially set to zero, is incremented (step 210) with each iteration step. The current value of the kernel pointer kdx indicates which of the available pixon kernel functions from the pixon kernel function table F is to be evaluated (step $220_{kdx}$) during that iteration step.

For each of the modalities A and B, in particular, for each image data set $D_A$ and $D_B$ and respective input objects $\psi_A$, and $\psi_B$ associated with a modality, one evaluates the effect of the pixon kernel function identified by the kernel pointer kdx on the input objects $\psi_A$, $\psi_B$ (steps $220_{kdx}$). The results of the evaluations are stored in an array of modality specific goodness-of-fit fields $GOF_{kdx,A}$, and $GOF_{kdx,B}$. The goodness-of-fit field $GOF_{kdx,A}$ stores a goodness-of-fit value for modality A when using the pixon kernel function identified by a particular kernel pointer kdx. Analyzing the goodness-of-fit fields $GOF_{kdx,A}$, and $GOF_{kdx,b}$ of the modalities A and B results in updated parameters $200_{kdx}$ for the iteration (step $225_{kdx}$). These updated parameters $200_{kdx}$ are stored in the GOF-field, the pixon map field (map), and the condition field (pxncond), which are now associated with the kernel function identified by the kernel pointer kdx of that iteration step.

At the end of the iteration step, one determines whether another kernel function should be evaluated (step 230). If so, the kernel pointer kdx is increased (step 210). The pixon kernel function identified by the updated kernel pointer kdx and the updated parameters $200_{kdx}$ are used as input parameters for the next evaluation. Once a pixon kernel function has been determined for each object point, the pixon map construction is completed and the multimodal pixon map P is made available to the pixon reconstruction unit 120.

As shown in FIG. 2, the same pixon kernel function identified by index kdx is used for evaluating the smoothing effect on the data sets of the involved modalities (step $220_{kdx}$). However, the effect of a specific kernel function on an input object $\psi_A$, $\psi_B$ is evaluated individually for each modality. For example, assuming a pixon kernel function described with a continuous mathematical function, the projection of the pixon kernel function on object spaces with differing resolution my result in smoothing over different amounts of object points due to different discretisation of the pixon kernel function in the respective object spaces.

Moreover, also the goodness-of-fit statistic need not be the same for the different modalities. What is important is that goodness-of-fit statistics be amenable to collective use for providing a "combined goodness-of-fit statistic" in the multimodal analysis (step $225_{kdx}$). For example, the combined goodness-of-fit statistic can be the sum of the goodness-of-fit statistics of all the modalities.

In some cases, one may wish to normalize the combined goodness-of-fit statistic and/or weight the contributions of the individual goodness-of-fit statistics. The weighting 30 can depend on, for example, the signal-to-noise ratio (SNR) associated with the various modalities. Thus, if one were to derive a multimodal pixon map from data sets with a high and a low signal-to-noise ratio, the contribution of the modality having the low signal-to-noise ratio to the reconstruction of the multimodal pixon map can be limited in extent. Such a situation may arise when high SNR CT image data and low SNR nuclear image data are used. In such a case, the multimodal pixon map may be based only on the CT image data and not on the nuclear image data.

Different modalities may be described with different system matrices H. Similarly, forward and backward projections between object space and data space may differ from one modality to the next, as long as the individual goodness-of-fit statistics can be collectively analyzed, e.g., added.

For the case that modalities are reconstructed with different resolutions, e.g., initial image objects ψ are provided with different resolutions, one can adapt the goodness-of-fit fields $GOF_{kdx,A}$, and $GOF_{kdx,B}$ to a common object space, for example to the object space with the highest resolution. When this occurs, one may need to rescale the resolution of the multimodal pixon map depending on the modality for which the pixon reconstruction algorithm 120 is applied.

FIG. 3 shows an exemplary flowchart of how one evaluates (step 220$_{kdx,B}$) the smoothing effect of a pixon kernel function on the input object ψ$_B$ for the modality B of FIG. 1 and how the fields $GOF_{kdx,A}$, $GOF_{kdx,B}$, and $GOF_{kdx,C}$ are provided to the multimodal map update (step 225$_{kdx}$).

Referring to step 220$_{kdx,B}$, one first smoothes the input object ψ$_B$ with the kernel function indicated by index kdx and statistically evaluates a difference object derived from the input object ψ$_B$ and the smoothed object (step 300). Then, one computes a $GOF_{kdx,B}$-value for each entry of the difference object (step 310). In the object space of the modality B, the values of the $GOF_{kdx,B}$-field define a goodness-of-fit for the object smoothed with the pixon kernel function identified by the kernel pointer kdx. Some details associated with the calculation of the difference (step 300), and the calculation of a goodness-of-fit value (step 310) are described in connection with FIGS. 4 and 5, respectively. In a like manner, one can perform for additional modalities A and C a statistical evaluation that yields goodness-of-fit fields $GOF_{kdx,A}$ and $GOF_{kdx,C}$ for their respective smoothed object in the respective object spaces.

The values of the three goodness-of-fit fields $GOF_{kdx,A}$, $GOF_{kdx,B}$, and $GOF_{kdx,C}$ are then subjected to a GOF-analysis step (step 320), which evaluates, for each object point, the specific contributions of each of those values. This results in updated GOF-values in the goodness-of-fit field ($GOF_{kdx}$). In a following single kernel map update (step 330), those values are used to further update input parameters 200$_{kdx-1}$.

Figure 6:
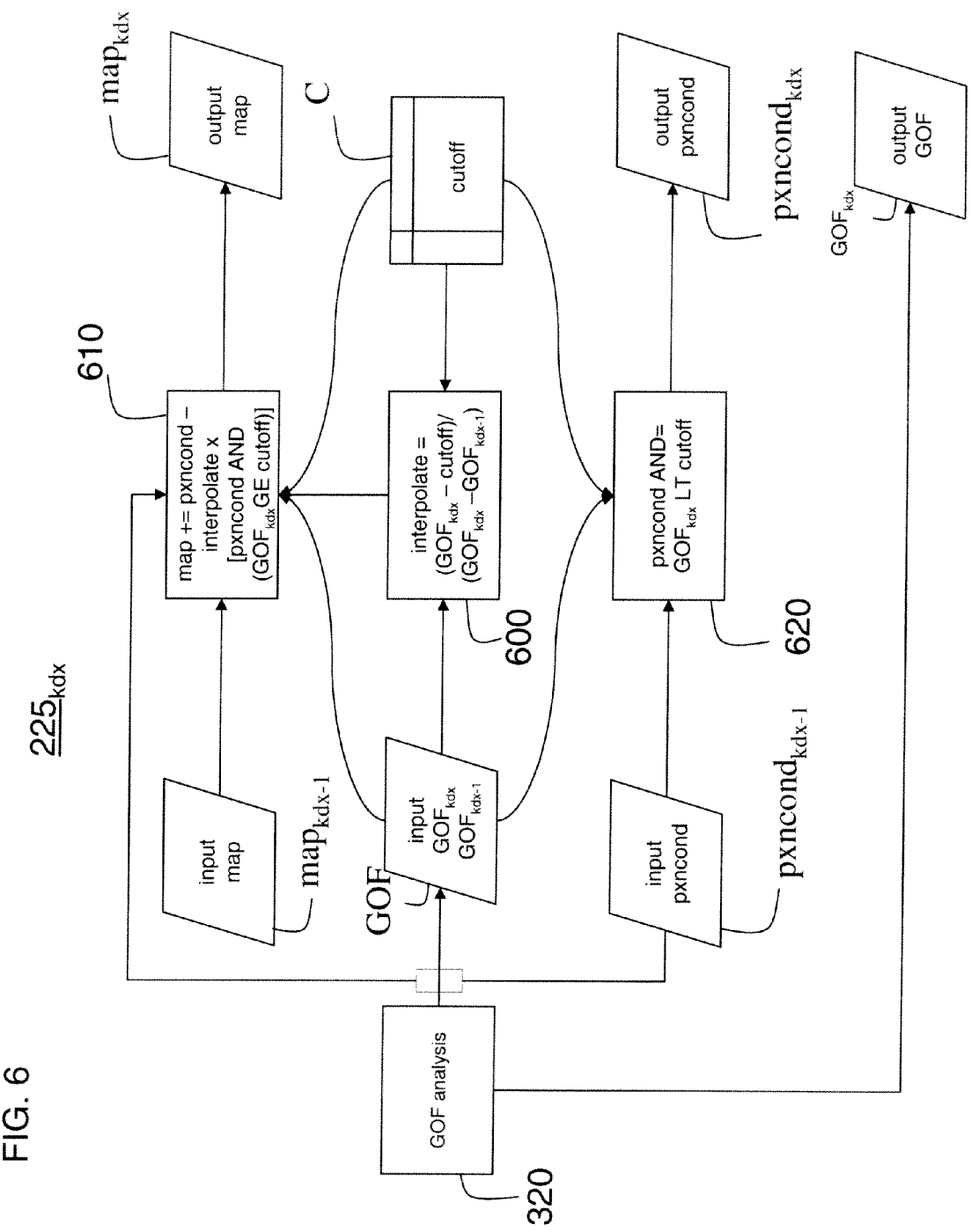
FIG. 6 is a flowchart of an exemplary single kernel map of the iteration step of FIG. 3.

Details of the single-kernel map update (step 330) are shown in FIG. 6. In general, the single-kernel map update (step 330) uses input parameters 200$_{kdx-1}$ of the previous iteration (or the initial parameters 200$_0$ for the first iteration). Since the single-kernel map update may make use of the previous goodness-of-fit values $GOF_{kdx-1}$, one stores these values temporarily in a $GOF_{kdx-1}$-field (step 340). As described in connection with FIG. 7, the single-kernel map update evaluates whether a GOF-value fulfills a specified requirement. For example, when a GOF-value of an object point passes a cut-off value, one updates the corresponding pixon map entries of the map-field. The multimodal analysis (step 225$_{kdx}$) ultimately yields the set of updated parameters 200$_{kdx}$ as an output. These parameters include the updated values for the goodness-of-fit field $GOF_{kdx}$.

Figure 4:
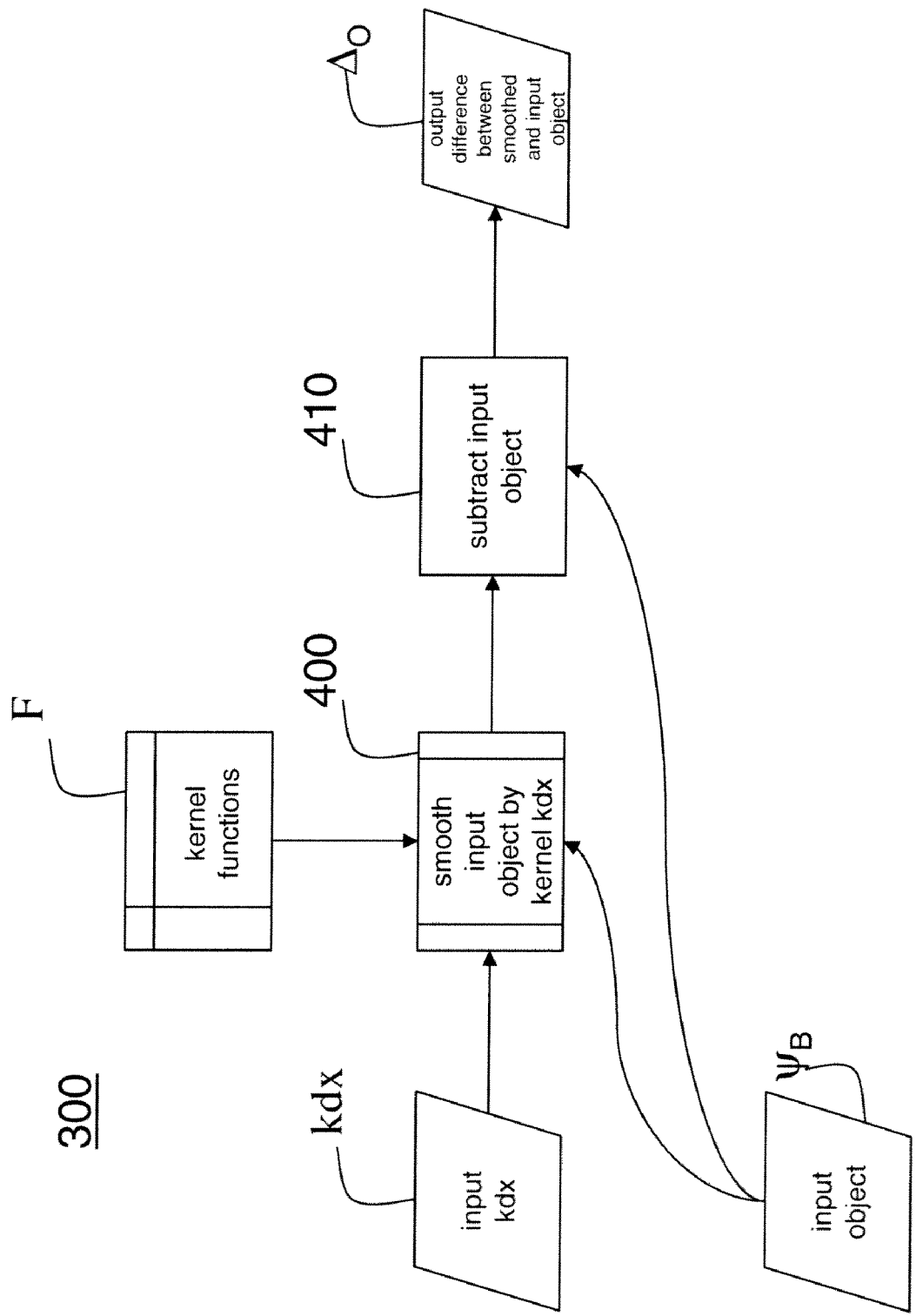
FIG. 4 is a flowchart of an exemplary calculation of a difference between a smoothed and unsmoothed object.

FIG. 4 shows a detailed flowchart for the computation of the difference between the input object ψ$_B$ and the smoothed object (step 300 in FIG. 3). As described below, the input object ψ$_B$ is smoothed (step 400) over the single kernel function, to which the kernel pointer kdx of the current iteration points in the pixon kernel function table F.

Pixon Smoothing Operation

Pixon smoothing can be viewed as averaging values of an object over a specific volume defined by the pixon kernel function. The smoothing operation can be written as a matrix operation using the pixon kernel operator K, such that the (smoothed) tomographic image object I is given by applying the pixon kernel operator K to a pseudo-image object ψ':

$$I_\alpha = \sum_\beta K_{\alpha\beta} \psi'_\beta$$

"Pseudo" indicates that the smoothing operation can be understood as a transformation (using the pixon kernel operator K) from a (pseudo-)object space, i.e. the pre-Pixon smoothing space, to the object space of the tomographic image object I.

Applying the transpose operator ($K^T$) of the pixon kernel operator, (K), then projects from the object space back into the pseudo-object space.

In many cases, the smoothing operation is a convolution operation given by:

$$I_\alpha = \sum_\beta K_{\alpha-\beta} \psi'_\beta$$

For small pixon kernel functions (i.e., small values of β) convolutions can be calculated by a direct summation. For large pixon kernel functions, convolutions can be calculated by fast Fourier transforms (FFTs). If the kernel function can be factorized, a product of operators can be applied to simplify the calculation.

Kernel functions, which can be discrete or continuous, are defined over a volume that surrounds an object point. The volume can be limited to include one or more object points but less than the complete object space, or it can extend over the complete object space. Examples for pixon kernel functions include a Gaussian function, an inverted paraboloid, or a function $f(x;\beta)=(1+\beta x^2)^{-1/\beta^2}$, which approximates the Gaussian and parabolic functions for β-values of zero or infinity. The shapes of the kernel functions can be symmetric, or they can be adjusted in response to a form prevailing in the tomographic image object I, for example, a shape of an organ in the three spatial coordinates. Within the shape of the pixon kernel functions, one can weigh the contribution of an object point. A limiting case of a pixon kernel function is the delta-function, in which the pixon smoothed object and the unsmoothed object are identical.

Referring again to FIG. 4, which illustrates the smoothing with a single pixon kernel function, each object point of the input object ψ$_B$ is smoothed with the same kernel function within an iteration step of the pixon map construction. The kernel operator K includes only the pixon kernel function of the respective iteration.

Following the pixon smoothing operation (step 400), the input object B is subtracted from the smoothed object (step 410) to create a delta object Δ$_O$, which is defined in object space. The delta object Δ$_O$ is an object, whose entries correspond to the difference of two approximations of an image. Using the measured data set D$_B$ of the modality B, one can statistically evaluate the delta object Δ$_O$. If the evaluation is performed in data space, a projection of the delta object Δ$_O$ into data space is desirable.

Object Space and Data Space

The object space and the data space of a particular modality are related to each other through the system matrix H of the respective modality. A "forward projection" is an application of the system matrix H to an object in object space. The result of a forward projection is a "projected object" in data space. For example, projecting an estimated image into data space results in a data model M (index i for data points in data space) of that estimated image (index α for object points in object space):

$$M_i = \sum_\alpha H_{i\alpha} I_\alpha$$

However, the system matrix H is rarely applied as a matrix multiplication. Instead, it is represented as a product of operators $H_n$:

$$H = H_n \otimes \ldots \otimes H_2 \otimes H_1$$

Corresponding to the forward projection, the backward projection from the data space into object space can be described as an application of the transpose $H^T$ of the system matrix H:

$$I_\alpha = \sum_i H_{\alpha i} M_i$$

The transpose $H^T$ is also rarely applied as a matrix multiplication. Instead, it is represented as a product of operators:

$$H^T = H_1^T \otimes H_2^T \otimes \ldots \otimes H_n^T$$

Evaluation of the Pixon Smoothing Operation

Figure 5:
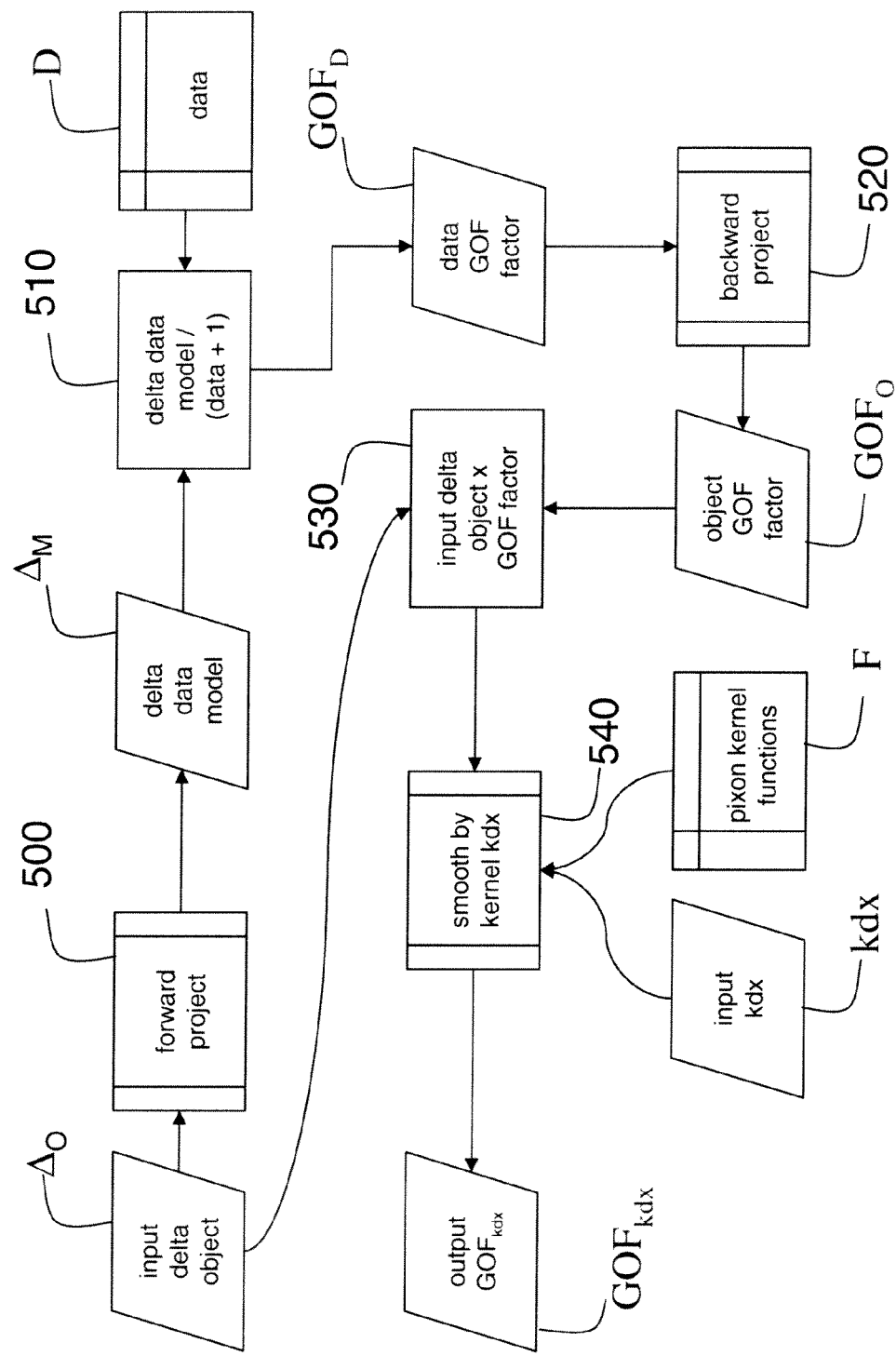
FIG. 5 is a flowchart of an exemplary calculation of a goodness-of-fit of the difference between a smoothed and unsmoothed object.

FIG. 5 shows details of the calculation of goodness-of-fit values associated with the delta object $\Delta_O$ (step 310). First, one projects the delta object $\Delta_O$ forward into data space (step 500) to form a delta data model $\Delta_M$, which then is evaluated statistically (step 510). The statistical evaluation can be based on a point-wise comparison of each entry of the delta data model $\Delta_M$ with the measured data set $D_B$.

For some modalities, the statistical evaluation can consider specifics of the statistic of a data set. For example, a statistical evaluation derived from a modified chi-square-gamma statistic can be applied to nuclear imaging data for which one can assume Poisson statistics. An example of a modified chi-square-gamma statistic is described in K. J. Mighell, "Parameter estimation in astronomy with Poisson-distributed data. I. The $\chi_\gamma^2$ statistic," Astrophys. J., 1999, 518: 380-393 and K. J. Mighell, "Parameter estimation in astronomy with Poisson-distributed data. II. The modified chi-square gamma statistic", 2000, arXiv:astro-ph/0007328, the contents of which are herein incorporated by reference.

The chi-square-gamma statistic of Mighell is defined by:

$$\chi_\gamma^2 = \sum_{j=1}^{J} \frac{(d_j + \text{Min}\{d_j, 1\} - m_j)^2}{d_j + 1},$$

wherein $d_j$ and $m_j$ are the j-th entries of the measured data set D and the data model M, respectively. J is the number of data points in data space, i.e., the number of data points in the data set D.

Modifications of Mighell's statistical weight can also be used. Examples of such modifications are described in U.S. patent application Ser. No. 11/931,030 filed Oct. 31, 2007 and entitled "DETERMINING A PIXON MAP FOR IMAGE RECONSTRUCTION," the contents of which are herein incorporated by reference.

As explained in the U.S. patent application "DETERMINING A PIXON MAP FOR IMAGE RECONSTRUCTION,"

the change $\Delta\chi_\gamma^2$ can be understood to include a statistical evaluation $\Delta_M|(d+1)$ for each data point in data space using a "Mighell statistical weight" d+1. In data space, one can therefore calculate goodness-of-fit factors $GOF_D$ by dividing each value of the delta data model $\Delta_M$ by the Mighell statistical weight, i.e., by the sum of the corresponding value of the data set and "1" (step 510).

To determine the effect of smoothing in object space, one projects the goodness-of-fit factors $GOF_D$ backward into object space (step 520) to obtain corresponding goodness-of-fit values $GOF_O$ in object space. These object space goodness-of-fit factors $GOF_O$ are then multiplied by the entries of the delta object $\Delta_D$ (step 530). One may then smooth the results using the current pixon kernel function (step 540), which is that pixon kernel function identified by the kernel pointer kdx from the kernel function table F.

Referring back to FIG. 3, the output of the evaluation (step $220_{kdx,B}$) is a field $GOF_{kdx,B}$ of goodness-of-fit values for the modality B corresponding to the value of the kernel pointer kdx. These goodness-of-fit values \are used to determine the combined goodness-of-fit field $GOF_{kdx}$, that is specific for the pixon kernel function indicated by the pixon kernel pointer kdx. The combined goodness-of-fit field $GOF_{kdx}$ is then used to determine whether a broader kernel function should be tested for the corresponding object point (step 310). Thus, the goodness-of-fit value of the goodness-of-fit field $GOF_{kdx}$ for an object point can be considered as a criterion to select a pixon kernel function for that object point. An exemplary analysis of $GOF_{kdx}$-values derived for multiple modalities is described below.

Pixon Map Update

FIG. 6 shows details of carrying out the multimodal analysis (step $225_{kdx}$) of FIGS. 2 and 3. In particular, the GOF-analysis 320 determines the goodness-of-fit values to be stored in the $GOF_{kdx}$-field. These values are used by the single-kernel map update (step 330) to perform its update. For example, the modality specific values $GOF_{kdx,A}$, $GOF_{kdx,B}$, and $GOF_{kdx,C}$ are added together to form the combined goodness-of-fit values $GOF_{kdx}$.

The single-kernel map update process (step 330) includes comparing the goodness-of-fit values of the goodness-of-fit field $GOF_{kdx}$ with a cut-off value C and updating the multimodal pixon map P for those object points that have goodness-of-fit values for the current iterations that are beyond the cut-off value C. For such object points, one assigns a value to the multimodal pixon map P that corresponds to an interpolation between the most recently rejected goodness-of-fit value and the most recently accepted goodness-of-fit value.

Thus, in the single-kernel map update (step 330), one calculates an interpolation value interpolate for each of the object points. The interpolation value interpolate is defined as the ratio of the difference between the goodness-of-fit value at an object point of the goodness-of-fit field $GOF_{kdx}$ and the cut-off C and the difference between the two most recent goodness-of-fit values of the goodness-of-fit fields $GOF_{kdx}$ and $GOF_{kdx-1}$ (step 600). To update the pixon map field from the pixon map field $map_{kdx-1}$ of the previous iteration, one increases each of its values by the corresponding value of the condition field pxncond and, if the corresponding goodness-of-fit value exceeds the cut-off value C, one reduces the value by the interpolation value interpolate (step 610). This results in the updated pixon map field $map_{kdx}$.

Within the single-kernel map update (step 330), the condition field pxncond is also updated. For object points having goodness-of-fit values in excess of the cut-off C, the updated value of the condition field $pxncond_{kdx}$ is set to zero. For object points having goodness-of-fit values less than the cut-off C, the updated value of the condition field pxncond$_{kdx}$ stays equal to one (step 620).

During the construction of the multimodal pixon map P, the values of the pixon map field map are increased for every tested kernel function until the goodness-of-fit value exceeds the cut-off value C. Then, for these object points, the pixon condition field pxncond is modified to indicate that the object points no longer participate in the pixon map construction process.

The cut-off value C represents a tradeoff between noise and image quality. If one sets the cut-off value C too high, over-smoothing will occur; if one sets the cut-off value C too low, the image will show avoidable noise features. The output of the single kernel map update (step 320) is an update of the multimodal pixon map P$_{kdx}$, and the condition field pxncond-$_{kdx}$. The next step will consider the next pixon kernel function indicated by an increased kernel pointer kdx+1.

In some practices, the calculation of goodness-of-fit (step 310) uses architecture similar to that used in the OSEM algorithm as used for the iterative reconstruction of PET or SPECT data. The OSEM algorithm is described in H. M. Hudson and R. S. Larkin, "Accelerated image reconstruction using ordered subsets of projection data," IEEE Transactions on Medical Imaging, vol. 13, no. 4, pp. 601-609, 1994, the contents of which are herein incorporated by reference. The use of the OSEM algorithm enables a map determination to be done on the same or only slightly modified, reconstruction architecture. Thus, existing subroutines can be used.

The multimodal pixon map can be applied in a variety of pixon reconstruction algorithms, some of which are described in the following for two and more modalities. In general, the concepts can easily be adapted to any number of modalities provided by a multimodality imaging system.

Sequential Pixon Smoothing

Figure 7:
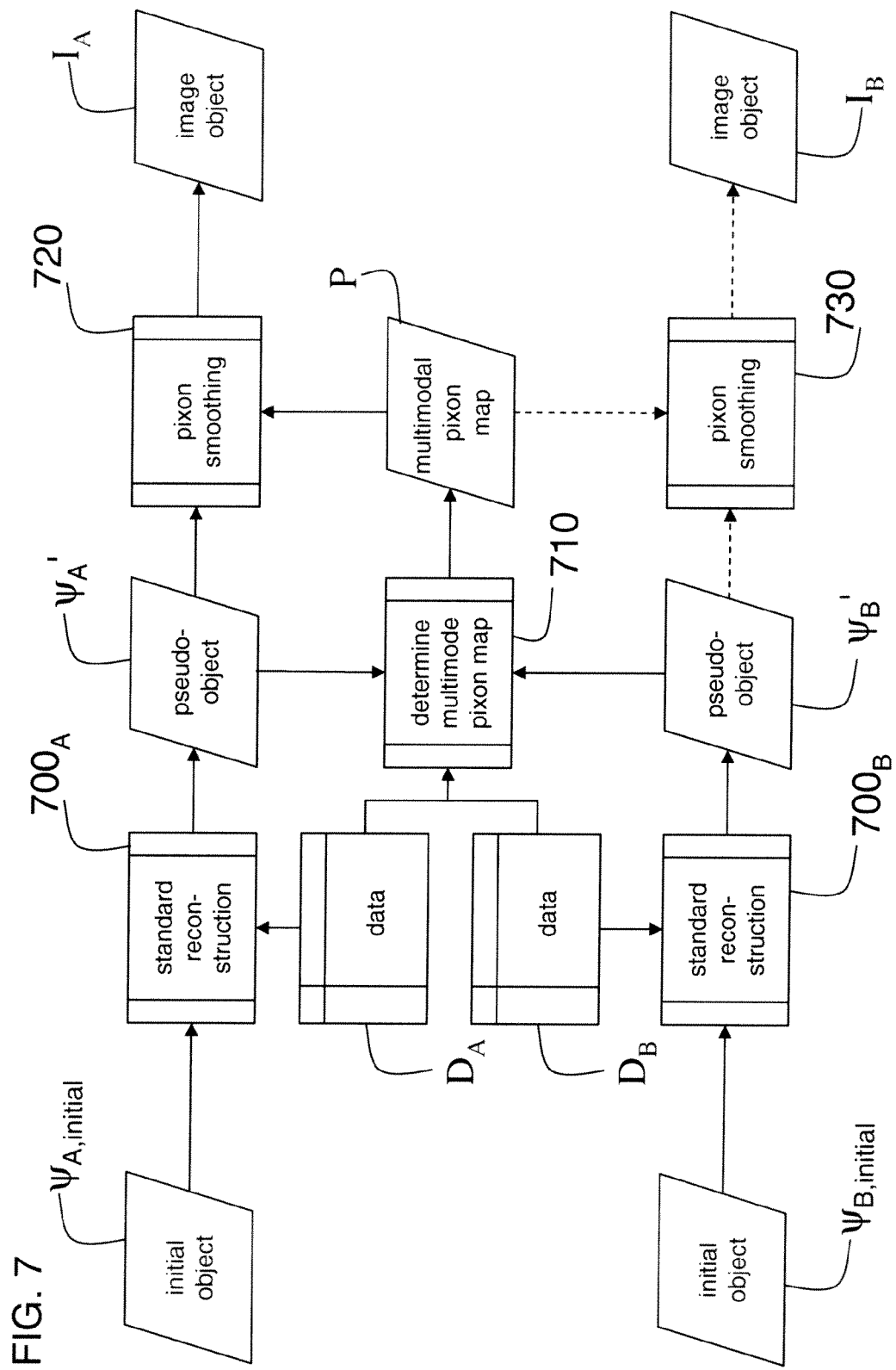
FIG. 7 is a flowchart illustrating an example of image reconstruction using pixon smoothing based on a multimodal pixon map.

In FIG. 7, pixon smoothing is applied sequentially to a standard reconstruction algorithm. Examples of reconstruction algorithms include iterative image reconstruction methods, such as maximum likelihood, non-negative least square or OSEM algorithms, which iteratively fit image models to the data. An overview of different reconstruction methods is given in R. C. Puetter et al. "Digital Image Reconstruction: Deblurring and Denoising," Annu. Rev. Astro. Astrophys., 2005, 43: 139-194, the contents of which are herein incorporated by reference. Another approach is the above mentioned OSEM algorithm. Within the OSEM algorithm, an iteration step is defined as a single pass through a set of data subsets. For each data subset, one uses the current estimate to initialize the application of the expectation maximization.

Using standard reconstruction algorithms, initial objects $\psi_{A,initial}$ and $\psi_{B,initial}$ are fitted to the data sets $D_A$ and $D_B$, respectively (step 700), with the data sets $D_A$ and $D_B$ having been measured using the two modalities A and B of FIG. 1. In accordance with the earlier discussion of the pixon kernel operator K, the resulting estimates of the image objects are referred to as pseudo-objects $\psi_A'$ and $\psi_B'$.

One then calculates the multimodal pixon map P using the pseudo-object $\psi_A'$ and $\psi_B'$ and the data sets $D_A$ and $D_B$ (step 710). The pseudo-object $\psi_A'$ is also the initial object for the pixon smoothing operation (step 720), which will be described in more detail in connection with FIGS. 8 and 9. During the pixon smoothing operation (step 720), one smoothes each object point of the pseudo-object $\psi_A'$ over one or more pixon kernel functions, thereby generating the reconstructed tomographic image object $I_A$. In addition, one can also smooth the pseudo-object $\psi_B'$ (step 730) based on the multimodal pixon map P, thereby generating the reconstructed tomographic image object $I_B$. The image objects $I_A$ and $I_B$ are reconstructed objects that fulfill the additional constraints imposed by the pixon method.

Figure 8:
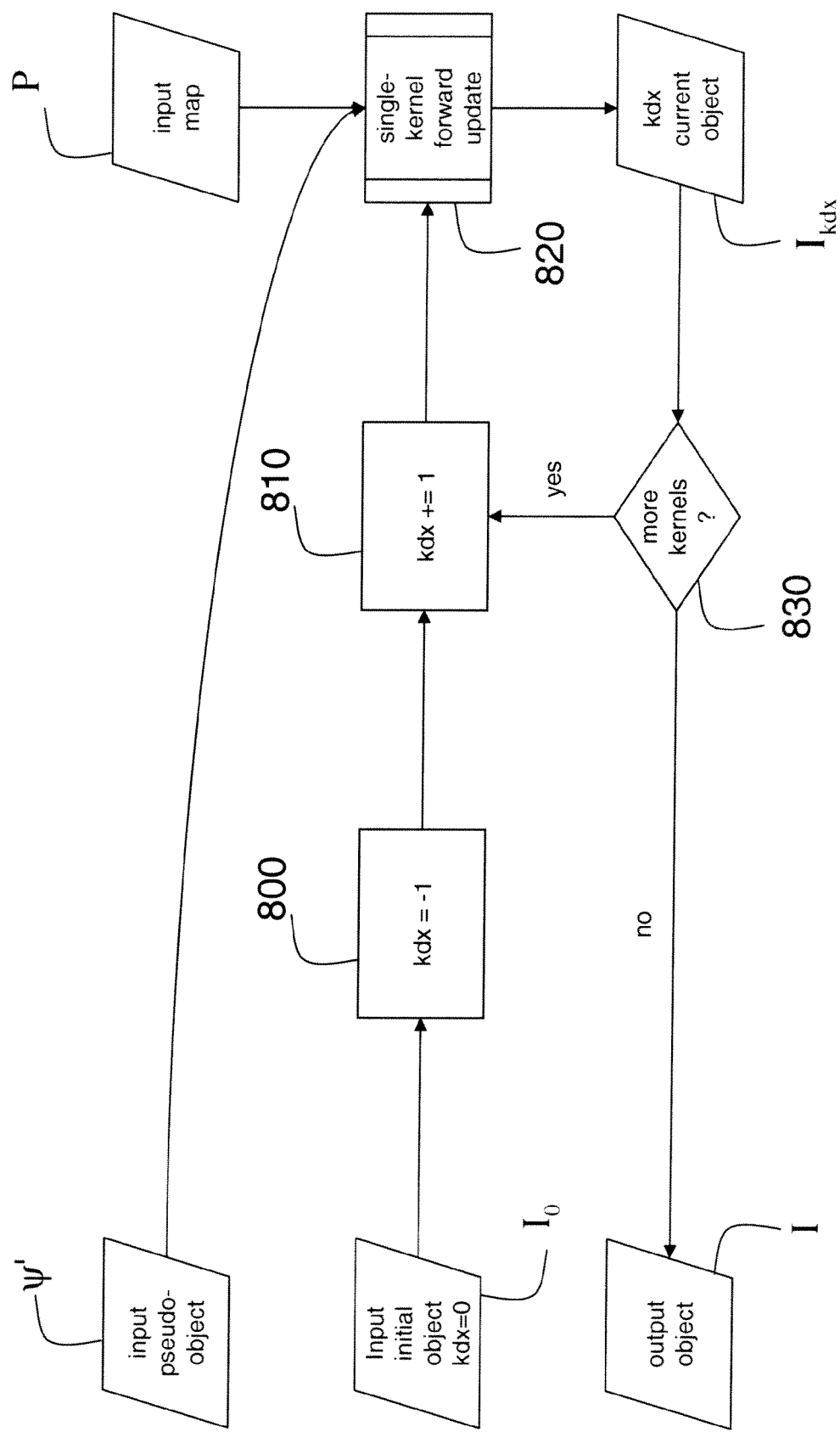
FIG. 8 is a flowchart illustrating a pixon smoothing operation.

FIG. 8 illustrates generally a forward pixon smoothing operation for a pseudo-object $\psi'$. Using the multimodal pixon map P, one builds a smoothed image by smoothing each object point with the pixon kernel function that is assigned to that object point in the multimodal pixon map P. The smoothed image is composed by smoothing the pseudo-object $\psi'$ iteratively with the pixon kernel functions indicated in the multimodal pixon map P. For the first step, one prepares a kernel pointer kdx (indicating the kernel function) and an initial image object $I_0$ (steps 800 and 810). The initial image object $I_0$ has the dimension of the tomographic image object and has all its object points set to zero. The kernel pointer kdx and the initial image object $I_0$ are provided to a single-kernel function forward update (step 820). The pseudo-object $\psi'$ and the multimodal pixon map P are also input parameters to the single-kernel forward update (step 820). Output parameters of the single-kernel forward update (step 820) are the unchanged kernel pointer kdx and an updated tomographic image object $I_{kdx}$. At the end of each iteration, one determines whether another pixon kernel function update is necessary (step 830), in which case the kernel pointer kdx needs to be increased (step 810), or whether all kernel functions have been considered, in which case one assigns the updated tomographic image object $I_{kdx}$ to be the final tomographic image object I.

Figure 9:
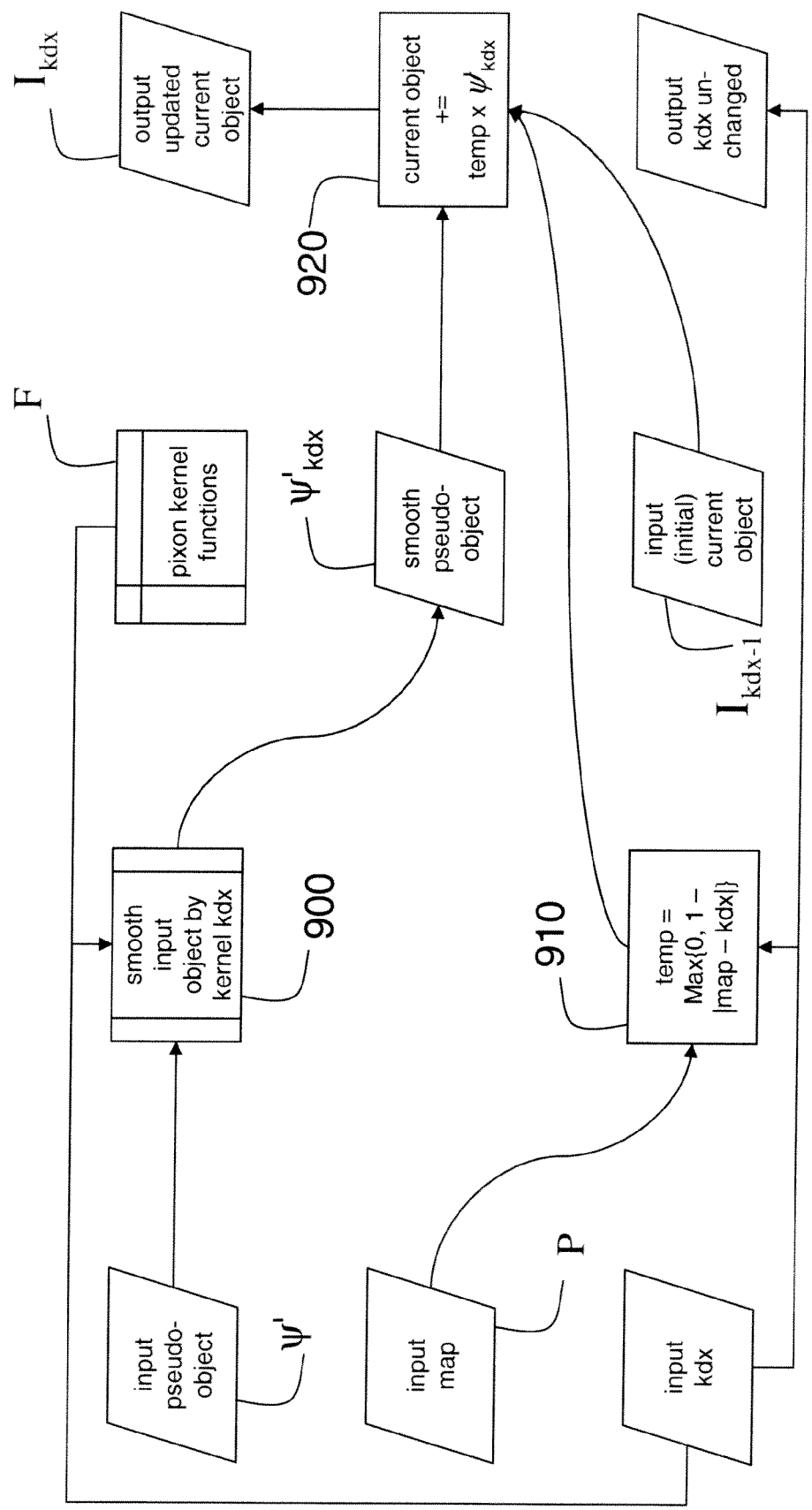
FIG. 9 is a flowchart illustrating a single-kernel function update during the pixon smoothing operation of FIG. 8.

FIG. 9 shows, in detail, the steps in the single-kernel function update (step 820) of a preceding tomographic image object $I_{kdx-1}$ as discussed in connection with FIG. 8. The preceding tomographic image object $I_{kdx-1}$ comprises smoothed values for all object points for which the multimodal pixon map P indicated smoothing with pixon kernel functions identified by kernel pointers smaller than the current kernel pointer kdx. The pseudo-object $\psi'$ is smoothed with the kernel function indicated by the current kernel pointer kdx. The result is a smoothed pseudo-object $\psi'$kdx (step 900). Then, one determines how much a data point is affected by the current kernel function (step 910). The corresponding calculation uses the multimodal pixon map P and the current value of the kernel pointer kdx to determine a temporary field temp, which is zero if the object point is not affected. The temporary field temp has values between 0 and 1 when two kernel functions are used for smoothing of the object point, and a value of 1 when only the current pixon kernel function is used for smoothing of the object point. For updating each affected object point of the tomographic image object $I_{kdx-1}$, one adds, to the current value of the tomographic image object $I_{kdx-1}$, the product of the values of the temporary field temp and of the smoothed pseudo-object $\psi'_{kdx}$ of that object point (step 920). The result is the updated tomographic image object $I_{kdx}$.

There exist a variety of ways to apply sequential pixon smoothing. For example, pixon smoothing can be applied multiple times until the quality of a corresponding data model fulfills a stop-criterion that depends on the goodness-of-fit with respect to the data model. Single or multiple pixon smoothing can be followed by standard reconstruction using the pixon smoothed object as an initial object for the reconstruction. Additionally, or as an alternative to pixon forward smoothing with the operator K, a backward pixon smoothing operation can be used to smooth the object with a transposed pixon operator $K^T$.

Exemplary pixon reconstruction algorithms of the kind shown in FIG. 7 are described in, for example, U.S. patent application Ser. No. 11/931,084 filed Oct. 31, 2007 and entitled "EXTERNAL PIXON SMOOTHING FOR TOMO- GRAPHIC IMAGE RECONSTRUCTION," the contents of which are herein incorporated by reference.

Pixon Reconstruction Algorithm

Figure 10:
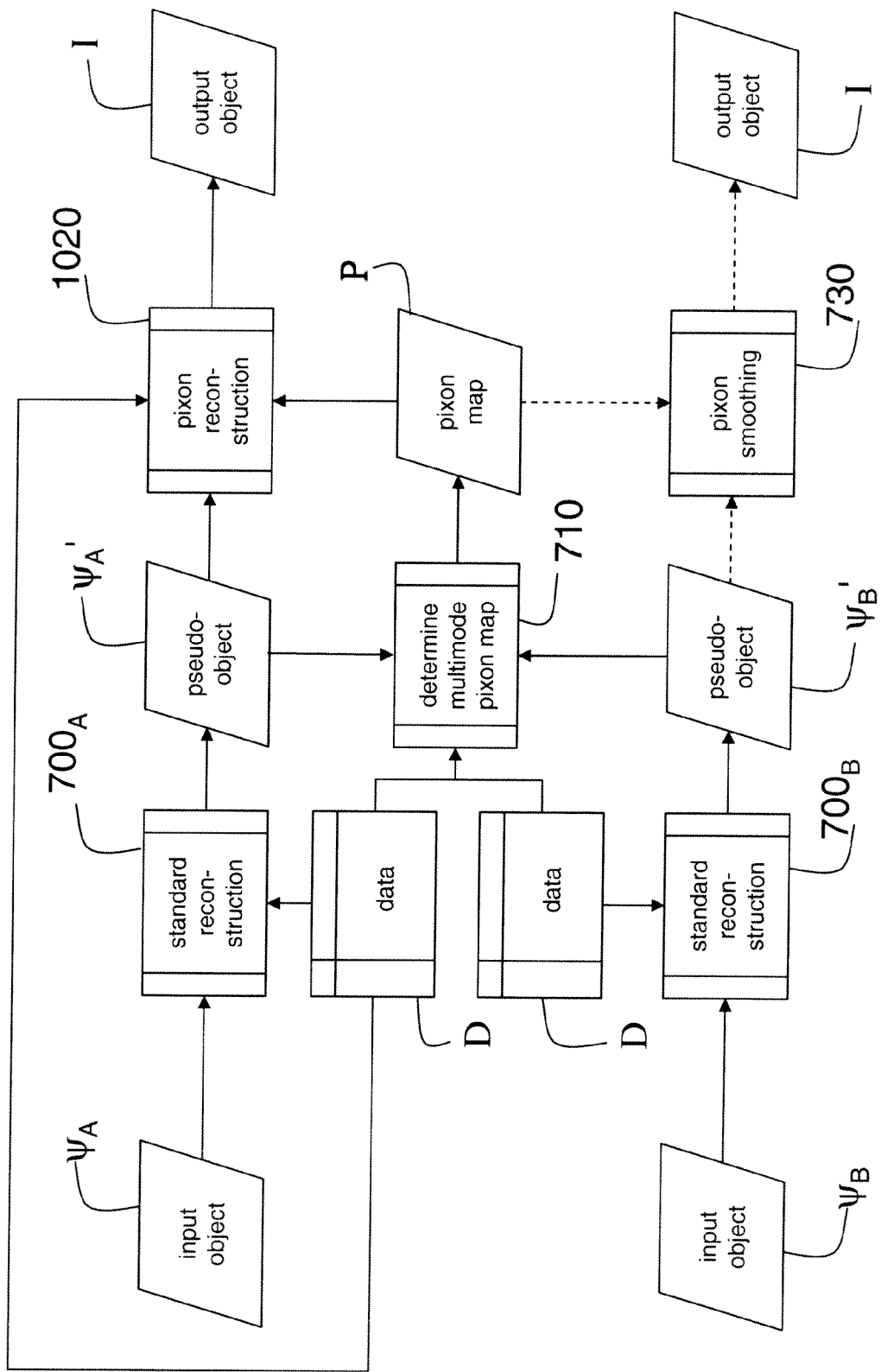
FIG. 10 is a flowchart illustrating an example of image reconstruction using pixon reconstruction based on a multimodal pixon map.

FIG. 10 illustrates sequential application of pixon reconstruction to a standard reconstruction algorithm. As was the case for sequential pixon smoothing, pseudo-objects $\psi_A'$ and $\psi_B'$ and a multimodal pixon map Pare determined (steps 700 and 710). However, in the method shown in FIG. 10, the pixon smoothing operation of FIG. 7 (step 720) for the reconstruction of the image $I_A$ is replaced by a pixon reconstruction (step 1000). The basis of pixon reconstruction (step 1000) is an iterative reconstruction algorithm that uses pixon smoothing operations within the iteration.

Examples of such pixon smoothing operations include application of the pixon operator K, before a forward projection operation from object space into data space or application of a transposed pixon operator $K^T$ following a backprojection from data space into object space. Thus, the pixon method is integrated in an iteration step of an iterative reconstruction algorithm. For example, pixon smoothing operations can be integrated into conventional reconstruction algorithms, such as non-negative least squares fits, or into reconstruction algorithms using subsets of the data set D, such as the OSEM algorithm.

Figure 11:
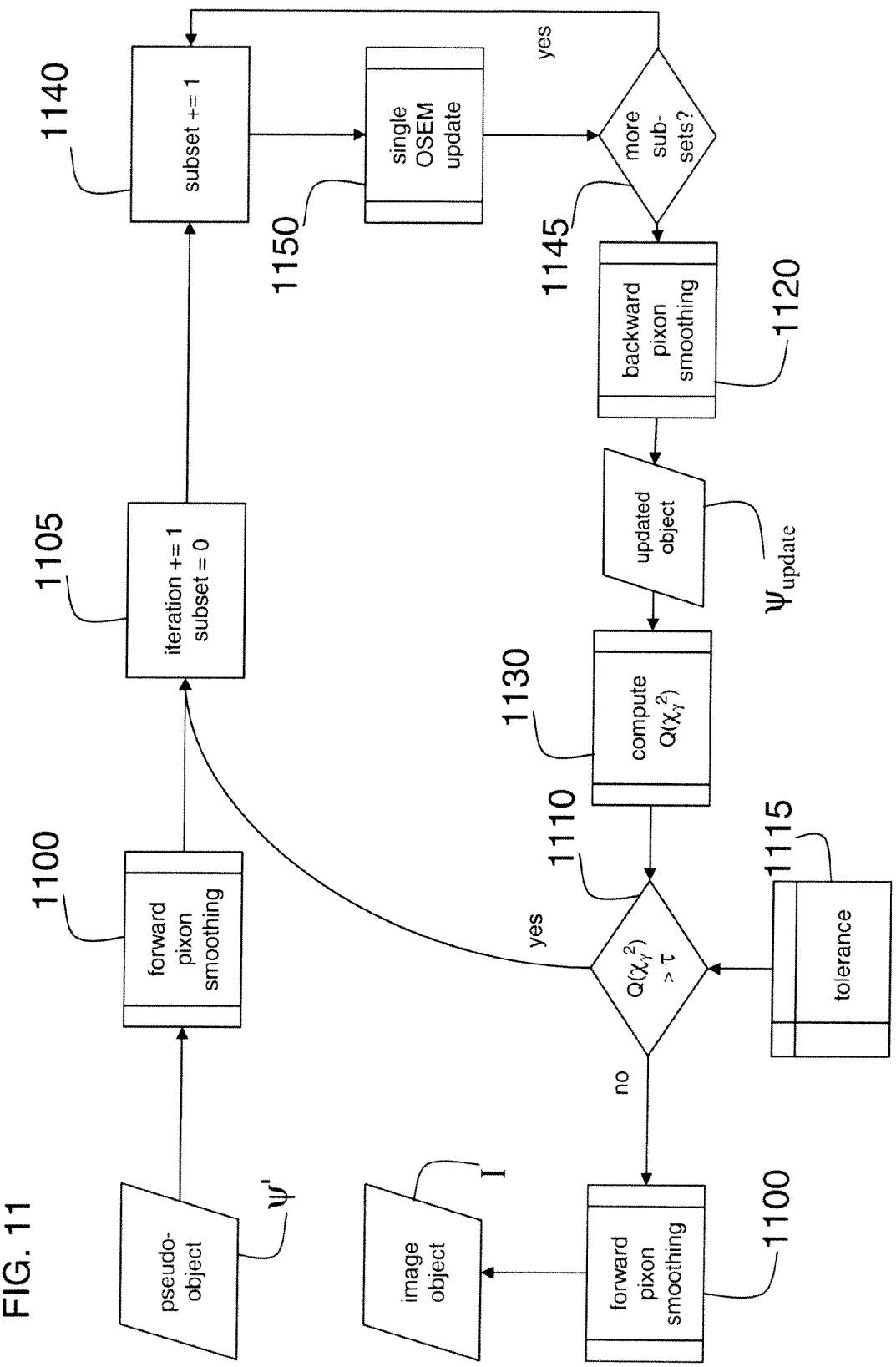
FIG. 11 is a flowchart illustrating pixon reconstruction based on an OSEM algorithm.

FIG. 11 illustrates, as an example, a pixon reconstruction algorithm 1000 based on an OSEM algorithm. Within the pixon reconstruction algorithm, a first pixon forward smoothing operation (step 1100) based on pixon operator K is applied to a pseudo-object $\psi'$ before entering the iteration cycle, indicated by the increase of the increment iteration (step 1105). A pixon forward smoothing operation of an updated object $\psi_{update}$ is applied after a comparison (step 1110) of a stop-criterion, $Q(\chi_\gamma^2)$, with a threshold, $\tau$, read from a tolerance table 1115. A pixon backward smoothing operation (step 1120) based on the transposed pixon operator $K^T$ is applied before calculating $Q(\chi_\gamma^2)$ (step 1130).

Alternatively, or in addition, pixon forward smoothing operations can be applied before entering the subset iteration cycle (indicated by the increase of the increment subset (step 1140) and by the test of additional subsets (step 1145)) or, for a subset, before a single OSEM update (step 1150). Another pixon backward smoothing operation can be applied after the single OSEM update (step 1150).

Exemplary pixon reconstruction algorithms of this kind are described in, for example, U.S. patent application Ser. No. 11/931,195 filed Oct. 31, 2007 and entitled "RECONSTRUCTING A TOMOGRAPHIC IMAGE," the contents of which are herein incorporated by reference.

Combined Pixon Map and Reconstruction Algorithm

Moreover, the pixon reconstruction and the standard reconstruction can be combined into a combined pixon map and reconstruction algorithm that estimates the final image object based on an input object $\psi$ while updating the multimodal pixon map during the reconstruction. The input object $\psi$ is used to determine an initial pixon map, which is used for applying the first pixon smoothing operation within the combined pixon map and reconstruction algorithm. Updated multimodal pixon maps are calculated within the algorithm. An output of the combined pixon map and reconstruction algorithm can include a final multimodal pixon map, which indicates the pixon kernel functions used for the last smoothing operation and which can also be used for the reconstruction of data from another modality.

Multimodal Reconstruction Algorithm

Figure 12:
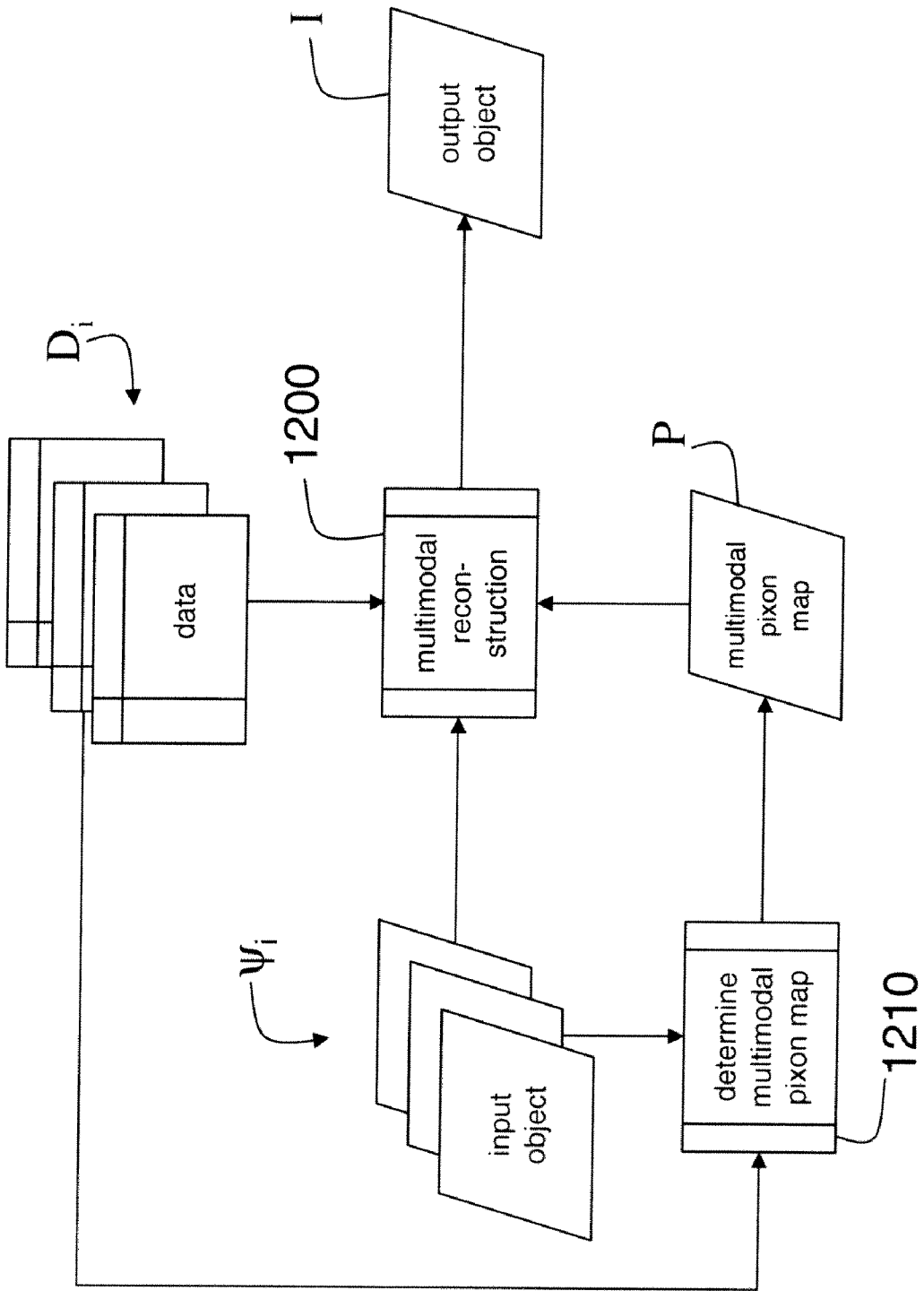
FIG. 12 is a flowchart illustrating an example of image reconstruction using mulitmodal pixon reconstruction based on a multimodal pixon map.

Referring to FIG. 12, a multimodal pixon map P can also be used within a multimodal reconstruction algorithm (step 1200), which is based on multiple data sets $D_i$ and a set of input objects $\psi_i$. The multimodal pixon map is derived from one or more of the data sets $D_i$ (step 1210). In addition, at least one of the data sets $D_i$ also includes support information (e.g., structural information) that is used for the reconstruction and can be derived within the multimodal reconstruction algorithm (step 1200) or can be derived externally and then supplied to the multimodal reconstruction algorithm (step 1200). The modality which allowed deriving the support information is referred to as support modality.

In particular, the multimodal reconstruction (step 1200) uses the support information to further improve the reconstruction of a tomographic image object I from one of the data sets $D_i$. For example, the support information can include zonal information about at least two zones for use as a zone specific constraint. During the reconstruction, the zonal constraint is maintained for a zone.

In some embodiments, the multimodal reconstruction algorithm (step 1200) is based on zonal objects, each corresponding to one of the zones. The multimodal reconstruction (step 1200) can include smoothing operations and pixon map updates at various positions within the reconstruction.

Exemplary pixon reconstruction algorithms of this kind are described in, for example, U.S. patent applications entitled "MULTIMODAL IMAGE RECONSTRUCTION" and "MULTIMODAL PIXON RECONSTRUCTION," by A. Yahil and H. Vija, filed on even date herewith, the contents of which are herein incorporated by reference.

A number of embodiments have been described. Nevertheless, it will be understood that various modifications may be made without departing from the spirit of the invention described by the appended claims. For example, instead of being supplied to a renderer for visualization, the output object can be supplied to a record keeping system (e.g., PACS system) or a system for automatic quantitative diagnosing.

The multimodal pixon map can be constructed based on a data set for tomographic reconstructing 3D or higher dimensional objects (e.g., including temporal smoothing). Accordingly the dimension of the object space may be 3D or of a higher dimension.

The order in which the different pixon kernel functions are tested can be varied, the step size can be varied, or some pixon kernel functions may be considered only in defined areas of the image.

The table F of the pixon kernel function may comprise, for example, ten spherical kernel functions. If one does not want to impose symmetry, one may use additionally or alternatively elliptical pixon kernel functions. However, asymmetric kernel functions may increase the computational burden. To overcome this additional burden, one may use specifically designed hardware.

The multimodal pixon map P can be provided, for example, as a field of variables defining the pixon kernel functions or as a field of indices, which indicate kernel functions within the table F of the pixon kernel functions.

When determining the multimodal pixon map P for a data set having a known probability distribution (such as a Poisson distribution) various statistical evaluations can be used to determine the effect of the pixon smoothing operation with a selected pixon kernel function. For example, as an alternative to the Mighell weight discussed in connection with FIG. 5 (step 510), a value of the delta data model $\Delta_M$ could be divided by Mighell-like statistical weights, such as the sum of the corresponding value of the data set D and a statistical-data-offset number. Examples for Mighell-like statistical weight include a statistical-data-offset numbers between 0 and 20, between 0.1 and 10, between 0.5 and 5, or equal to 0.3, 0.5, 0.75, 1, 1.25, 1.5, 1.75, 2, 3, 4 and 5. Alternatively, one can employ within a Mighell-like statistical weight a condition such as dividing the delta data model $\Delta_M$ by the corresponding value of the data set or the sum of the corresponding value of the data set and the statistical-data-offset number, only if the value of the data set D is greater than some threshold, for example greater than 0. If the condition is not fulfilled one uses the value zero for that data point.

Various combinations of the pixon methods described referring to FIGS. 7 to 12 can be employed. The pixon smoothing operation may include the calculation of an average of the values of the object points within the volume defined by the corresponding pixon kernel function.

It is to be further understood that, because some of the constituent system components and method steps depicted in the accompanying figures can be implemented in software, the actual connections between the systems components (or the process steps) may differ depending upon the manner in which the disclosed method is programmed. Given the teachings provided herein, one of ordinary skill in the related art will be able to contemplate these and similar implementations or configurations of the disclosed system and method.

For example, the numerical and symbolic steps described herein can be converted into a digital program executed on a digital signal processor according to methods well known in the art. The digital program can be stored on a computer-readable medium such as a hard disk and can be executable by a computer processor. Alternatively, the appropriate steps can be converted into a digital program that is hardwired into dedicated electronic circuits within the processor that executes the steps. Methods for generating such dedicated electronic circuits based on a given numerical or symbolic analysis procedure are also well known in the art.

Accordingly, other embodiments are within the scope of the following claims.

What is claimed is:

1. A computer-implemented method, the method comprising causing a computer system to execute instructions for:
   providing a first data set and a second data set, each derived from a common object;
   providing a first tomographic image object associated with the first data set;
   providing a second tomographic image object associated with the second data set;
   generating a multimodal pixon map for pixon smoothing on the basis of the first data set, the first tomographic image object, the second data set, and the second tomographic image object; and
   outputting the multimodal pixon map.

2. The method of claim 1, wherein generating the multimodal pixon map further includes evaluating a smoothing effect of a pixon kernel function on the first tomographic image object and the second tomographic image object and determining a contribution of the pixon kernel function to the multimodal pixon map based on the evaluation.

3. The method of claim 2, wherein evaluating the smoothing effect on the first tomographic image object is determined with a lower resolution in object space than the smoothing effect on the second tomographic image object.

4. The method of claim 1, wherein the second data set characterizes the object with a higher signal-to-noise ratio than the first data set.

5. The method of claim 1, wherein generating the multimodal pixon map further includes co-registering an object space associated with the first tomographic image object and an object space associated with the second tomographic image object.

6. The method of claim 1, wherein providing a first data set further includes receiving the first data set from a nuclear imaging system.

7. The method of claim 1, wherein providing a second data set further includes receiving the second data set from one of a nuclear imaging system, a computed tomography imaging system, and a nuclear magnetic resonance imaging system.

8. The method of claim 1, wherein generating the multimodal pixon map further includes for each of the first tomographic image object and second tomographic image object:
   selecting a pixon kernel function from the set of pixon kernel functions;
   smoothing the first tomographic image object and the second tomographic image object on the basis of the selected pixon kernel function, thereby creating a first smoothed object and a second smoothed object;
   determining a first statistical object for the selected pixon kernel function on the basis of the first smoothed object, the first data set, and a first statistical weight;
   determining a second statistical object for the selected pixon kernel function on the basis of the second smoothed object, the second data set, and a second statistical weight;
   determining a contribution of the pixon kernel function to a multimodal pixon map based on the first statistical object and the second statistical object; and
   assigning a value to the multimodal pixon map corresponding to the contributions of the pixon kernel functions.

9. The method of claim 8, wherein the first statistical object and the second statistical object are further determined on the basis of the first tomographic image object and the second tomographic image object, respectively.

10. The method of claim 8, wherein determining at least one of the first statistical object and the second statistical object further includes
    determining a delta object by subtracting the respective object from the smoothed object;
    determining a delta data model by projecting the delta object from object space into data space;
    determining statistical data factors by evaluating the delta data model using the data set and a statistical weight;
    determining statistical object factors by back-projecting the statistical data factors from data space into object space; and
    determining the statistical object by multiplying the entries of the delta object by the corresponding statistical object factors.

11. The method of claim 1, wherein generating the multimodal pixon map further includes providing pixon kernel functions from the group consisting of symmetrical pixon kernel functions, spherical pixon kernel functions, elliptical pixon kernel functions, pixon kernel functions based on a delta-function, pixon kernel functions based on a Gaussian function, pixon kernel functions based on an inverted paraboloid, and pixon kernel functions based on the function $f(x;\beta) = (1+\beta x^2)^{-1/\beta^2}$.

12. A computer-implemented method, the method comprising causing a computer system to execute instructions for:
    providing a first data set and a second data set, each derived from a common object;
    providing a first tomographic image object associated with the first data set;
    providing a second tomographic image object associated with the second data set;
    generating a multimodal pixon map at least partly on the basis of the second data set and the second tomographic image object;

on the basis of the multimodal pixon map, performing pixon smoothing of the first tomographic image object, thereby generating a pixon smoothed tomographic image object; and outputting the pixon smoothed image object.

13. The method of claim 12, wherein generating the multimodal pixon map further includes:

determining, in a series of iterations, statistical objects for a set of pixon kernel functions, wherein each iteration includes selecting a pixon kernel function from the set of pixon kernel functions;

smoothing the second tomographic image object on the basis of the selected pixon kernel function, thereby creating a second smoothed object, respectively;

determining a second statistical object for the selected pixon kernel function on the basis of the second smoothed object, the second data set, and a second statistical weight; and determining contributions of the pixon kernel functions to a multimodal pixon map based on the second statistical object.

14. The method of claim 12, wherein the pixon smoothing is performed within a reconstruction algorithm selected from the group consisting of algorithms based on maximum likelihood, algorithms based on an ordered subset expectation maximization, algorithms based on a non-negative least square fit, algorithms based on an ordered subset non-negative least square fit, and algorithms based on a pixon method, and the reconstruction algorithm is configured to derive a reconstructed image object from the first data set.

15. A medical imaging system comprising:

a data acquisition system configured to provide at least a first data set and a second data set derived from a patient;

a multimodal pixon map construction unit configured to construct a multimodal pixon map based on at least partly the second data set, and a set of pixon kernel functions; and a pixon reconstruction unit configured to reconstruct a tomographic image object using a pixon smoothing operation based on the multimodal pixon map and the first data set.

16. The medical imaging system of claim 15, wherein the data acquisition system comprises a first detector unit for detecting radiation emitted from within the patient and providing data indicative of the detected radiation.

17. The medical imaging system of claim 15, wherein the data acquisition system comprises a second detector unit for detecting radiation transmitted through the patient and providing data indicative of the transmitted radiation.

18. The medical imaging system of claim 15, wherein the data acquisition system comprises a nuclear magnetic resonance coil system for detecting nuclear magnetic resonance signals emitted from the patient and providing data indicative of the source density of nuclear magnetic resonance signal.

19. The medical imaging system of claim 15, wherein the multimodal pixon map construction unit is configured to generate a first smoothed object by pixon smoothing with a single pixon kernel function a first tomographic object derived from the first data set, and to statistically evaluate the goodness-of-fit of the first smoothed object.

20. The medical imaging system of claim 15, wherein the multimodal pixon map construction unit is configured to generate a second smoothed object by pixon smoothing with a single pixon kernel function a second tomographic object derived from the second data set, and to statistically evaluate the goodness-of-fit of the second smoothed object.

21. The medical imaging system of claim 15, wherein the pixon reconstruction unit is configured to run a reconstruction algorithm selected from the group consisting of algorithms based on maximum likelihood, algorithms based on an ordered subset expectation maximization, algorithms based on a non-negative least square fit, and algorithms based on an ordered subset non-negative least square fit, and wherein the reconstruction algorithm includes at least one pixon smoothing operation based on the multimodal pixon map.

* * * * *